(12) United States Patent
Kwon et al.

(10) Patent No.: US 9,521,558 B2
(45) Date of Patent: Dec. 13, 2016

(54) COMPUTING SYSTEM WITH COORDINATION MECHANISM AND METHOD OF OPERATION THEREOF

(71) Applicant: Samsung Electronics Co., Ltd., Suwon-si, Gyeonggi-Do (KR)

(72) Inventors: Hyukjoon Kwon, San Diego, CA (US); Jungwon Lee, San Diego, CA (US); Inyup Kang, San Diego, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/294,810

(22) Filed: Jun. 3, 2014

(65) Prior Publication Data
US 2014/0364064 A1    Dec. 11, 2014

Related U.S. Application Data

(60) Provisional application No. 61/833,343, filed on Jun. 10, 2013.

(51) Int. Cl.
| | |
|---|---|
| *H04B 1/00* | (2006.01) |
| *H04B 15/00* | (2006.01) |
| *H04B 17/00* | (2015.01) |
| *H04W 16/14* | (2009.01) |

(52) U.S. Cl.
CPC .................... *H04W 16/14* (2013.01)

(58) Field of Classification Search
CPC ..... H04W 52/244; H04B 15/00; H04L 1/0026
USPC .............. 455/63.1, 63.2, 63.4, 67.13, 69, 296,455/67.11; 370/252, 310, 343
See application file for complete search history.

(56) References Cited

U.S. PATENT DOCUMENTS

| | | | |
|---|---|---|---|
| 8,077,796 B2 | 12/2011 | Qi et al. | |
| 8,179,844 B2 | 5/2012 | Zheng et al. | |
| 8,488,441 B2 | 7/2013 | Venturino et al. | |
| 8,934,395 B2* | 1/2015 | Gorokhov | H04L 1/0002 370/315 |
| 9,215,017 B2* | 12/2015 | Kwon | H04B 17/318 |
| 2009/0296635 A1* | 12/2009 | Hui et al. | 370/328 |
| 2010/0027456 A1* | 2/2010 | Onggosanusi | H04B 7/024 370/312 |

(Continued)

OTHER PUBLICATIONS

H.Dahrou, and W.Yu; "Coordinated beamforming for the multicell multi-antenna wireless system", Wireless Communications, IEEE Transactions on, vol. 9, No. 5, pp. 1748,1759, May 2010.

(Continued)

Primary Examiner — Simon Nguyen
(74) Attorney, Agent, or Firm — IP Investment Law Group

(57) ABSTRACT

A computing system includes: an inter-device interface configured to communicate a coordination report for representing a receiver signal associated with an interference-aware receiver capable of recognizing an interference signal from an interference node device and included in the receiver signal; a communication unit, coupled to the inter-device interface, configured to: generate a rate coordination profile based on the coordination report for coordinating the interference signal with the interference node device, and generate a beam-forming mechanism based on the rate coordination profile for communicating a serving signal coordinated with the interference signal.

20 Claims, 6 Drawing Sheets

(56) References Cited

U.S. PATENT DOCUMENTS

| | | | |
|---|---|---|---|
| 2010/0080323 A1* | 4/2010 | Mueck | H04J 11/0033 375/296 |
| 2010/0106828 A1* | 4/2010 | Palanki et al. | 709/224 |
| 2011/0306350 A1* | 12/2011 | Barbieri | H04B 7/024 455/450 |
| 2012/0307926 A1* | 12/2012 | Kuo et al. | 375/267 |
| 2013/0114437 A1* | 5/2013 | Yoo | H04J 11/005 370/252 |
| 2013/0136062 A1* | 5/2013 | Gorokhov | 370/328 |
| 2013/0155967 A1 | 6/2013 | Kang et al. | |
| 2013/0156139 A1 | 6/2013 | Lee et al. | |
| 2013/0225188 A1* | 8/2013 | Seo et al. | 455/450 |
| 2013/0294398 A1* | 11/2013 | Tujkovic | H04J 11/0053 370/330 |
| 2013/0301432 A1* | 11/2013 | Hammarwall | H04W 24/02 370/252 |
| 2014/0038653 A1* | 2/2014 | Mildh et al. | 455/501 |
| 2014/0135028 A1* | 5/2014 | Wang | H04J 11/004 455/452.2 |
| 2014/0140317 A1* | 5/2014 | Mobasher | H04B 7/024 370/330 |
| 2014/0146756 A1* | 5/2014 | Sahin et al. | 370/329 |
| 2014/0153499 A1* | 6/2014 | Wang | H04W 24/02 370/329 |
| 2014/0219197 A1* | 8/2014 | Chaudhuri et al. | 370/329 |
| 2014/0256341 A1* | 9/2014 | Nayeb Nazar et al. | 455/452.1 |
| 2014/0307703 A1* | 10/2014 | Gaal | H04L 5/0073 370/330 |
| 2015/0110025 A1* | 4/2015 | Chae | H04B 7/024 370/329 |

OTHER PUBLICATIONS

S.W.Choi, S.A.Jafar, and S.Chung; "On the Beamforming Design for Efficient Interference Alignment", http://arxiv.org/pdf/0906.3737.pdf, Jul. 2009.

S.Yiu, M.Vu, and V.Tarokh; "Interference Reduction by Beamforming in Cognitive Networks", IEEE Transactions on Communications, vol. 57, issue10, pp. 3144-3153, Oct. 2009.

M.Hong, and Z.Luo; "Signal Processing and Optimal Resource Allocation for the Interference Channel", http://arxiv.org/pdf/1206.5144.pdf, Jun. 2012.

* cited by examiner

COMPUTING SYSTEM WITH COORDINATION MECHANISM AND METHOD OF OPERATION THEREOF

CROSS-REFERENCE TO RELATED APPLICATION(S)

This application claims the benefit of U.S. Provisional Patent Application Ser. No. 61/833,343 filed Jun. 10, 2013, and the subject matter thereof is incorporated herein by reference thereto.

TECHNICAL FIELD

An embodiment of the present invention relates generally to a computing system, and more particularly to a system with coordination mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with coordination mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an inter-device interface configured to communicate a coordination report for representing a receiver signal associated with an interference-aware receiver capable of recognizing an interference signal from an interference node device and included in the receiver signal; a communication unit, coupled to the inter-device interface, configured to: generate a rate coordination profile based on the coordination report for coordinating the interference signal with the interference node device, and generate a beam-forming mechanism based on the rate coordination profile for communicating a serving signal coordinated with the interference signal.

An embodiment of the present invention provides a method of operation of a computing system including: communicating a coordination report for representing a receiver signal associated with an interference-aware receiver capable of recognizing an interference signal from an interference node device and included in the receiver signal; generating a rate coordination profile based on the coordination report for coordinating the interference signal with the interference node device; and generating a beam-forming mechanism with a communication unit based on the rate coordination profile for communicating a serving signal coordinated with the interference signal.

An embodiment of the present invention provides a non-transitory computer readable medium including instructions for operating a computing system including: communicating a coordination report for representing a receiver signal associated with an interference-aware receiver capable of recognizing an interference signal from an interference node device and included in the receiver signal; generating a rate coordination profile based on the coordination report for coordinating the interference signal with the interference node device; and generating a beam-forming mechanism with a communication unit based on the rate coordination profile for communicating a serving signal coordinated with the interference signal.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
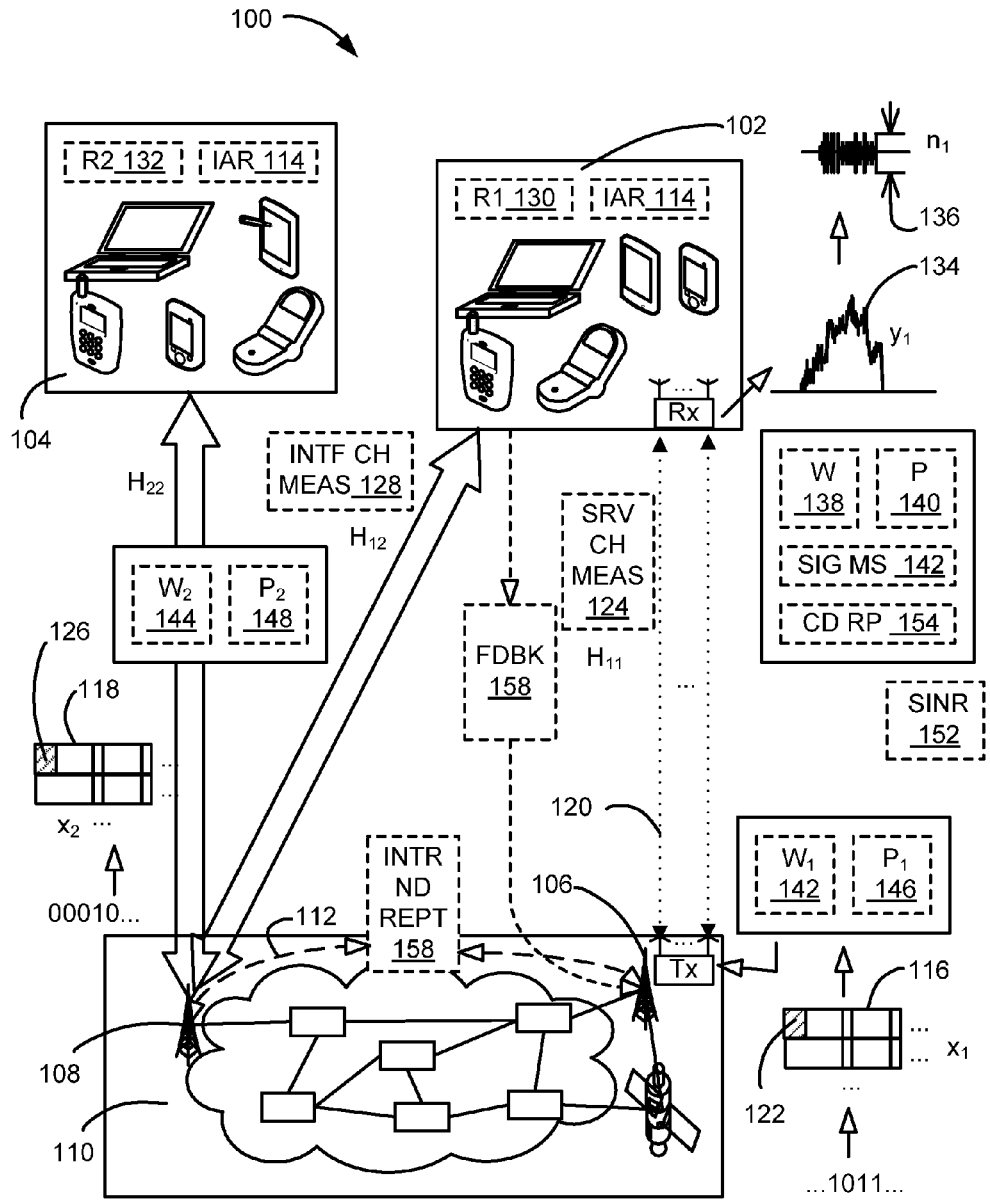
FIG. 1 is a computing system with coordination mechanism in an embodiment of the present invention.

The following embodiments of the present invention can be used to coordinate transmission of a serving signal and an interference signal for multiple transmitting devices. An iterative coordination mechanism can be used to generate a beam-forming mechanism, a power-allocation mechanism, or a combination thereof specific to the serving signal, the interference signal, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with coordination mechanism in an embodiment of the present invention. The computing system 100 can include a first user device 102, a second user device 104, a first node device 106, a second node device 108, or a combination thereof.

The first user device 102, the second user device 104, or a combination thereof can include a client device or a personal device, a server device, a communication device, or a combination thereof. The first user device 102, the second user device 104, or a combination thereof can be a mobile device including a cellular phone or a notebook computer, or a wearable device, or a combination thereof connected to a network 110. The first user device 102, the second user device 104, or a combination thereof can communicate using wired communication mechanism or a wireless communication mechanism. The first user device 102, the second user device 104, or a combination thereof can include a user equipment (UE).

The network 110 is a system of wired or wireless communication devices or means that are connected to each other for enabling communication between devices. For example, the network 110 can include a combination of wires, transmitters, receivers, antennas, towers, base stations, repeaters, telephone network, servers, or client devices for a wireless cellular network. The network 110 can also include a combination of routers, cables, computers, servers, and client devices for various sized area networks.

The computing system 100 can include the first node device 106, the second node device 108, or a combination thereof for directly or indirectly linking and communicating with the first user device 102, the second user device 104, or a combination thereof. The network 110 can include the first node device 106, the second node device 108, or a combination thereof for accessing the network 110.

The first node device 106, the second node device 108, or a combination thereof can receive wireless signals from the first user device 102, the second user device 104, or a combination thereof, transmit signals thereto, process signals, or a combination thereof. The first node device 106, the second node device 108, or a combination thereof can also communicate or relay signals, such as by sending or receiving signals, between other base stations, components within the network 110, or a combination thereof. The first node device 106 and the second node device 108 can similarly communicate with each other or other node devices.

The first user device 102, the second user device 104, or a combination thereof can be connected to the network 110 through the first node device 106, the second node device 108, or a combination thereof. For example, the first node device 106, the second node device 108, or a combination thereof can include a user device or a mobile device acting as a base station, an access point, a hub, a hotspot, a tethering point, a peer-to-peer network component, or a combination thereof. Also for example, the first node device 106, the second node device 108, or a combination thereof can include a base station.

Also for example, the first node device 106, the second node device 108, or a combination thereof can include a communication device or a processing component included in or with a cell tower, a wireless router, an antenna, or a combination thereof being used to communicate with the first user device 102, the second user device 104, or a combination thereof. Also for example, the first node device 106, the second node device 108, or a combination thereof can include an evolved node B (eNodeB) as an element in an air interface representing evolved UMTS terrestrial radio access (e-UTRA).

The first user device 102, the second user device 104, or a combination thereof can connect to and communicate with other devices, such as each other, other mobile devices, servers, computers, telephones, or a combination thereof. For example, the first user device 102, the second user device 104, or a combination thereof can communicate with other devices by transmitting signals, receiving signals, processing signals, or a combination thereof. Also for example, the first user device 102, the second user device 104, or a combination thereof can communicate by displaying a content of the signals, audibly recreating sounds according to the content of the signals, processing according to the content, such as storing an application or updating an operating system, or a combination thereof.

The first node device 106, the second node device 108, or a combination thereof can be used to wirelessly exchange signals for communication, including voice signals of a telephone call or data representing a webpage and interactions therewith. The first node device 106, the second node device 108, or a combination thereof can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The network 110 can further include a node link 112. The node link 112 can include a method, a process, or a mechanism for directly communicating information between node devices or access points.

For example, the node link 112 can include a coordinating device for managing the first node device 106, the second node device 108, or a combination thereof. Also for example, the node link 112 can include a wired or wireless communication channel or connection, an exchanged information, a communication protocol, a method or a process for further processing the exchanged information, or a combination thereof between the first node device 106 and the second node device 108. As a more specific example, the node link 112 can include a back-channel for communicating between base stations.

The first user device 102, the second user device 104, or a combination thereof can include an interference-aware receiver 114 (IAR). The first user device 102, the second user device 104, or a combination thereof can use the interference-aware receiver 114 to process a serving signal 116, an interference signal 118, or a combination thereof.

The serving signal 116 is communicated information intended for a device receiving and processing the serving signal 116. The interference signal 118 is communicated information not intended for the device receiving and processing the interference signal 118 at the time of the reception.

For example, the first user device 102 and the first node device 106 can be intended communicating parties. The second user device 104 and the second node device 108 can further be communicating parties separate and independent from the first user device 102 and the second node device 108.

Continuing with the example, the serving signal 116 can be the signal exchanged between the first user device 102 and the first node device 106 from the perspective thereof. The interference signal 118 can be the signal exchanged between the second user device 104 and the second node device 108 from the perspective of the first user device 102, the first node device 106, or a combination thereof.

For illustrative purposes, the computing system 100 will be described from the perspective of the first user device 102 and the first node device 106 intending to communicate with each other using the serving signal 116 and receiving the interference signal 118 intended between the second user device 104 and the second node device 108. However, it is understood that the computing system 100 can utilize the below described processes for communicating between or from the perspective of the first user device 102, the second user device 104, the first node device 106, the second node device 108, or a combination thereof.

Also for illustrative purposes, the computing system 100 will be described from the perspective of the first node device 106 coordinating communication with the second node device 108. However, it is understood that the processes described below can be applicable to or executed by the first node device 106, the second node device 108, the first user device 102, the second user device 104, or a combination thereof.

Also for illustrative purposes, the interference signal 118 is described as communication between the second user device 104 and the second node device 108. However, it is understood that the interference signal 118 can be any information unintended for the receiving device at that time, such as from the first user device 102, the second user device 104, the first node device 106, the second node device 108, or a combination thereof.

The interference-aware receiver 114 is a device or a portion thereof configured to process and utilize the interference signal 118 in processing for the serving signal 116. The interference-aware receiver 114 can include an interference aware detector, decoder, or a combination thereof. The interference-aware receiver 114 can further include a joint detector, decoder, or a combination thereof configured to recognize, whiten, cancel or remove, detect, decode, or a combination thereof for the interference signal 118 in processing the serving signal 116.

The computing system 100 can process the serving signal 116, the interference signal 118, or a combination thereof utilizing one or more instances of a data stream 120. The data stream 120 can include a connection or a mechanism for communicating a specific sequence of information. The data stream 120 can include a layer, a distinct combination between an instance of transmitting antenna and an instance of receiving antenna, a timing or a frequency for communicating a particular sequence of data, or a combination thereof.

The communication system 100 can utilize a single instance of the data stream 120, such as for a single-input single-output (SISO) communication format. The communication system 100 can further simultaneously utilize multiple instances of the data stream 120, such as for a multiple-input multiple-output (MIMO) communication format.

The computing system 100 can further process the serving signal 116 using a serving reference 122 included therein. The serving reference 122 can be the reference portion within and specific to the serving signal 116.

The serving reference 122 can include a known or designated information transmitted by a device used to determine various types of information at a receiving device. The serving reference 122 can include a bit, a symbol, a signal pattern, a signal strength, frequency, phase, duration, or a combination thereof predetermined by the computing system 100, a standard, or a combination thereof. The details of the serving reference 122 can be known and used by one, multiple, or all devices in the computing system 100.

The serving reference 122 can include generic information, cell-specific information, or a combination thereof. The serving reference 122 can further include information regarding a transmission format. The detail, the structure, the content, or a combination thereof for the serving reference 122 can be used by the receiving device, such as the first user device 102, to determine information regarding a mechanism used to transmit data, including a serving channel measure 124.

The serving channel measure 124 can be a representation or a characterization of an environment or a connection between devices intended as communication parties. The serving channel measure 124 can represent or characterize a serving channel. The serving signal 116 can traverse the serving channel to arrive at the intended recipient device.

The serving channel can be a direct link between corresponding devices, such as between the first user device 102 and the first node device 106 or between the second node device 108 and the second user device 104. The serving channel can also include repeaters, amplifiers, or a combination thereof there-between for an indirect link. The serving channel can include a specific instance or value of communication detail, such as frequency, time slot, packet designation, transmission rate, channel code, or a combination thereof used for transmitting signals between intended devices.

The serving channel can further include physical characteristics unique to geographic locations associated with the intended devices. The serving channel can include structures or influences, such as fading characteristics of signals or causes for unique delay or reflection of signals, affecting the transmission of wireless signals. The serving channel can distort or alter the signals traversing therein.

The serving channel measure 124 can represent or characterize fading, distortions or alterations from delayed signals or echoes, or a combination thereof of the serving channel. The serving channel measure 124 can further represent a degradation, a loss, a change, a distortion, an alteration, or a combination thereof caused by traversing the serving channel.

For example, the serving channel measure 124 can include a matrix with a set of values representing changes to originally transmitted signal, observed at the receiving device after traversing the serving channel. Also for example, the serving channel measure 124 can further include a channel quality indicator (CQI).

The computing system 100 can similarly process the interference signal 118 using an interference reference 126 included therein. The interference reference 126 can be the reference portion within and specific to the interference signal 118. The interference reference 126 can be a known or designated information transmitted by the second node device 108 intended to determine various types of information at the second user device 104. The interference reference 126 can be similar in nature or function as the serving reference 122, but unintended for the device receiving the signal.

The computing system 100 can use the interference reference 126 to determine an interference channel measure 128. The interference channel measure 128 can be a representation or a characterization of an environment or a connection between devices unintended as communication parties. The interference channel measure 128 can represent or characterize an interference channel.

The interference channel can be similar to the serving channel but for the communicating devices and the unintended nature of the communication. The interference channel measure 128 can be similar to the serving channel measure 124 but for the communicating devices.

For example, the interference channel can be a direct link, such as for specific communication devices, the communication detail, unique physical characteristics, unique behaviors, or a combination thereof between the first user device 102 and the second node device 108, the second user device 104 and the first node device 106, or a combination thereof. Also for example, the interference channel measure 128 can be a representation or a characterization of the interference channel from the perspective of the unintended device, such as the first user device 102 or the first node device 106.

The computing system 100 can use the serving reference 122 to determine the serving channel measure 124. The computing system 100 can use the interference reference 126 to determine the interference channel measure 128.

The computing system 100 can include one or more metric for describing communication between devices. For example, the computing system 100 can include a serving communication capacity 130, an interference communication capacity 132, or a combination thereof.

The serving communication capacity 130 can represent a capability or an efficiency of communication processing for the serving signal 116. The serving communication capacity 130 can represent the capacity or the efficiency of the first user device 102, the first node device 106, or a combination thereof. The serving communication capacity 130 can be represented as '$R_{11}$'.

For example, the serving communication capacity 130 can include a speed or an amount of information exchanged between intended devices corresponding to the serving signal 116. The serving communication capacity 130 can characterize the speed or the amount for communication between the first user device 102 and the first node device 106. Also for example, the serving communication capacity 130 can describe a capacity for processing the interference signal 118 from the perspective of the first node device 106 using the interference-aware receiver 114 therein.

The interference communication capacity 132 can represent a capability or an efficiency of communication processing for the interference signal 118. The interference communication capacity 132 can represent the capacity or the efficiency of the second user device 104, the second node device 108, or a combination thereof. The interference communication capacity 132 can be represented as '$R_{22}$'.

For example, the interference communication capacity 132 can include a speed or an amount of information exchanged between intended devices corresponding to the interference signal 118. The interference communication capacity 132 can characterize the speed or the amount for communication between the second user device 104 and the second node device 108. Also for example, the interference communication capacity 132 can describe a capacity for processing unintended interferences from the perspective of the second node device 108 using the interference-aware receiver 114 therein.

For a point-to-point communication of the computing system 100, a receiving device, such as the first user device 102 or the second user device 104, can receive a receiver signal 134. The receiver signal 134 can include data or information available or captured at a particular device. The receiver signal 134 can correspond to the serving signal 116, the interference signal 118, or a combination thereof.

The receiver signal 134 can further include a noise measure 136. The noise measure 136 can be a representation of an error or a deviation in the data.

The noise measure 136 can represent the error or the deviation caused by a processing channel or a route for the data, hardware components processing signals, background noise, or a combination thereof. The noise measure 136 can also represent changes in the signal or the data due to hardware component limitations, such as tolerance levels or cross-talk between components. The noise measure 136 can be independent of the transmit symbols.

The noise measure 136 can represent the error or the deviation additive in nature and have a random Gaussian or Rayleigh distribution for the changes. The noise measure 136 can be specific to the first user device 102 receiving the receiver signal 134. The noise measure 136 can be represented as '$n_1$'.

The noise measure 136 can include a statistical characterization of the deviations or the errors. The noise measure 136 can include a covariance value. The noise measure 136 can further include a measure of spread, distancing, density, power, or a combination thereof for the noise portion 130. The noise measure 136 can be known to the computing system 100, such as in a look-up table, determined using a dedicated device or circuitry, or a combination thereof.

The receiver signal 134 can be represented as:

$$y_1 = H_{11}W_1P_1x_1 + H_{12}W_2P_2x_2 + n_1. \quad \text{Equation (1)}.$$

The term '$y_1$' can represent the receiver signal 134 at the first user device 102. The serving channel can be represented as '$H_{11}$' and the serving signal 116 can be represented as '$x_1$'. The interference channel can be represented as '$H_{12}$' and the interference signal 118 can be represented as '$x_2$'.

The computing system 100 can communicate between devices using a beam-forming mechanism 138, represented as 'W', a power-allocation mechanism 140, represented as 'P', or a combination thereof. The beam-forming mechanism 138 can include instances specific to the serving signal 116, the interference signal 118, or a combination thereof. For example, the beam-forming mechanism 138 can include a first beam mechanism 142, a second beam mechanism 144, or a combination thereof. The first beam mechanism 142 can be represented as '$W_1$', and the second beam mechanism 144 can be represented as '$W_2$'.

The power-allocation mechanism 140 can similarly include instances specific to the serving signal 116, the interference signal 118, or a combination thereof. For example, the power-allocation mechanism 140 can include a first power mechanism 146, a second power mechanism 148, or a combination thereof. The first power mechanism 146 can be represented as '$P_1$', and the second power mechanism 148 can be represented as '$P_2$'.

For illustrative purposes, the receiver signal 134 will be described as the signal received by the first user device 102. However, it is understood that the receiver signal 134 can represent the signal received by the first node device 106, the second user device 104, or the second node device 108.

For further illustrative purposes, the computing system 100 is described as the base station communicating information to the mobile device, such as the base station transmitting and the mobile device receiving the information. However, it is understood that the mobile device can communicate directly to each other or to the base station.

The beam-forming mechanism 138 is a method or a process for utilizing spatial and directional signal communication. The beam-forming mechanism 138 can be for implementing spatial selectivity. The beam-forming mechanism 138 can be for combining elements in a phased array for creating constructive interference, destructive interference, or a combination thereof for the signals at particular angles or locations.

The beam-forming mechanism 138 can use multiple transmitters, receivers, antennas, or a combination thereof to simultaneously transmit signals. The beam-forming mechanism 138 can control phase, relative amplitude, timing, or a combination thereof for the transmitted signal, such as the serving signal 116 or the interference signal 118. The beam-forming mechanism 138 can include a matrix or an array of values or factors for adjusting the transmission signal. The computing system 100 can communicate the multiple simultaneous signals, such as for MIMO, by varying the signals using the beam-forming mechanism 138.

The first beam mechanism 142 can be the beam-forming mechanism 138 utilized by the first node device 106, the first user device 102, or a combination thereof. The first beam mechanism 142 can be for transmitting the serving signal 116. The first beam mechanism 142 can include a serving beam mechanism.

The second beam mechanism 144 can be the beam-forming mechanism 138 utilized by the second node device 108, the second user device 104, or a combination thereof. The second beam mechanism 144 can be for transmitting the interference signal 118. The second beam mechanism 144 can include an interference beam mechanism.

The power-allocation mechanism 140 is a process or a method for distributing energy across transmitted signals. The power-allocation mechanism 140 can be for allocating or directing power towards stable or reliable channels, instances of the data stream 120, or a combination thereof. The power-allocation mechanism 140 can include a threshold, a matrix, a sequence of operations, or a combination thereof for allocating or directing power within the serving signal 116, the interference signal 118, or a combination thereof.

The first power mechanism 146 can be the power-allocation mechanism 140 utilized by the first node device 106, the first user device 102, or a combination thereof. The first power mechanism 146 can be for transmitting the serving signal 116. The first power mechanism 146 can include a serving power mechanism.

The second power mechanism 148 can be the power-allocation mechanism 140 utilized by the second node device 108, the second user device 104, or a combination thereof. The second power mechanism 148 can be for transmitting the interference signal 118. The second power mechanism 148 can include an interference power mechanism.

The computing system 100 can coordinate the beam-forming mechanism 138, the power-allocation mechanism 140, or a combination thereof between the first node device 106 and the second node device 108. The coordinated instances of the serving signal 116 and the interference signal 118 can be transmitted by the first node device 106 and the second node device 108.

The receiver signal 134 can be based on estimates made based on a receiving device. For example, the first user device 102, the second user device 104, or a combination thereof processing the receiver signal 134 may not know the beam-forming mechanism 138, the power-allocation mechanism 140, or a combination thereof.

Based on the receiving device, the receiver signal 134 can be further represented as:

$$y_1 = \tilde{H}_{11}x_1 + \tilde{H}_{12}x_2 + n_1. \quad \text{Equation (2)}.$$

The serving channel measure 124 can be represented as '$\tilde{H}_{11}$' and the interference channel measure 128 can be represented as '$\tilde{H}_{12}$'. Using Equation (1) and Equation (2), the computing system 100 can generate and coordinate the beam-forming mechanism 138, the power-allocation mechanism 140, or a combination thereof. Details regarding the coordination, the beam-forming mechanism 138, and the power-allocation mechanism 140 will be described below.

The computing system 100 can characterize or evaluate the communication based on a comprehensive signal measure 150. The comprehensive signal measure 150 is a representation or a characterization of the serving signal 116, the interference signal 118, the noise measure 136, or a combination thereof for a particular device. The comprehensive signal measure 150 can be represented as a ratio utilizing the serving signal 116, the interference signal 118, the noise measure 136, or a combination thereof.

For example, the comprehensive signal measure 150 can be the representation or the characterization from the perspective of the first user device 102 receiving and processing the receiver signal 134. Also for example, the comprehensive signal measure 150 can include a signal-to-interference ratio (SIR), a signal-to-noise ratio (SNR), an interference-to-noise ratio (INR), or a combination thereof.

The computing system 100 can communicate between devices without utilizing a signal-to-interference-plus-noise ratio (SINR) 152. The computing system 100 can communicate without processing for the SINR 152 based on the interference-aware receiver 114.

The computing system 100 can use the interference-aware receiver 114 to recognize, detect, decode, or a combination thereof for the interference signal 118 instead of treating the interference signal 118 like the noise portion or blindly assuming or removing estimation of the interference signal 118. Since contents of the interference signal 118 is recognized, detected, decoded, or a combination thereof with the interference-aware receiver 114, the computing system 100 can recognize that the SINR 152 is not applicable for the interference-aware receiver 114. The computing system 100 can communicate and coordinate without utilizing the SINR 152.

The computing system 100 can utilize a coordination report 154 in communicating the serving signal 116, the interference signal 118, or a combination thereof. The coordination report 154 is information used as input representing communications within an environment or a geographic area for coordinating communication between multiple sources within the environment or the area. The coordination report 154 can represent a characteristic of a channel between devices, a parameter or a characteristic of a signal transmitted near a device, or a combination thereof.

For example, the coordination report 154 can include a feedback report 158 for communicating information associated with processing the receiver signal 134. The feedback report 158 can be the coordination report 154 originated by an intended recipient of a communication signal. As a specific example, the feedback report 158 can include identification or capacity information of the first user device 102 to the first node device 106.

Also as a more specific example, the feedback report 158 can include the serving channel measure 124, the interference channel measure 128, the serving communication capacity 130, the interference communication capacity 132, the comprehensive signal measure 150, an error report, a status indication, a repeat request, or a combination thereof. Further as a more specific example, the feedback report 158 can include similar information as described above from the second user device 104 to the second node device 108.

The feedback report 158 can include the CQI communicated from the first user device 102 receiving and processing the receiver signal 134 to the first node device 106, the second node device 108, or a combination thereof. The feedback report 158 can include feedback information from the second user device 104 receiving and processing the receiver signal 134 to the first node device 106, the second node device 108, or a combination thereof.

Also for example, the computing system 100 can use the node link 112 to communicate an inter-node report 160 regarding the processing of the serving signal 116. The inter-node report 160 can include information regarding communication processed and intended for one node communicated to a different node in the network 110. The inter-node report 160 can include details for the serving signal 116, the interference signal 118, or a combination thereof communicated to or from the first node device 106, the second node device 108, or a combination thereof.

As a more specific example, the computing system 100 can use the node link 112 to communicate the inter-node report 160 including the serving channel measure 124, the interference channel measure 128, the serving communication capacity 130, the interference communication capacity 132, the comprehensive signal measure 150, or a combination thereof between the first node device 106 and the second node device 108. Also as a more specific example, the computing system 100 can use the node link 112 to communicate the inter-node report 160 including the feedback report 158 received from the first user device 102, the second user device 104, or a combination thereof between the first node device 106 and the second node device 108.

For illustrative purposes, the computing system 100 is described as having one instance of the serving signal 116 and one instance of the interference signal 118 relative to communicating between the first user device 102 and the first node device 106. However, it is understood that the computing system 100 can experience and process for multiple interference signals and sources. The computing system 100 can coordinate the communication of signals with two or more instances of the base stations.

Figure 2:
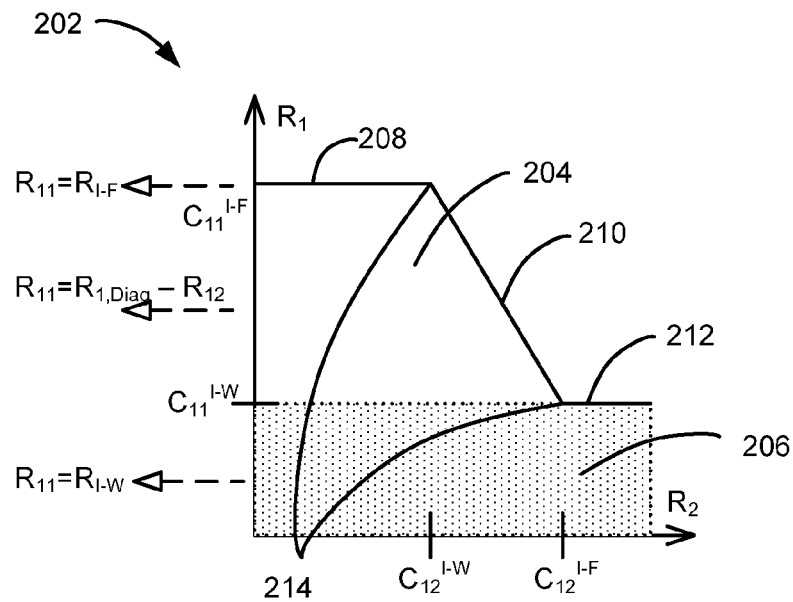
FIG. 2 is an exemplary illustration of a communication rate profile for the computing system of FIG. 1.

Referring now to FIG. 2, therein is shown an exemplary illustration of a communication rate profile 202 for the computing system 100 of FIG. 1. The communication rate profile 202 is a characterization of capacity or ability of one or more devices exchanging information. The communication rate profile 202 can represent a communication rate, an error rate, a relationship with an interference, or a combination thereof.

For illustrative purposes, the communication rate profile 202 has been represented with a graph for abstractly describing the communication rate profile 202. However, it is understood that the communication rate profile 202 can be implemented in various ways. For example, the communication rate profile 202 can include a table, an equation, a set of points or values, or a combination thereof.

The communication rate profile 202 can be for the interference-aware receiver 114 of FIG. 1. The communication rate profile 202 can describe the serving communication capacity 130 of FIG. 1, the interference communication capacity 132 of FIG. 1, an estimation thereof, a relationship there-between, or a combination thereof. For example, the communication rate profile 202 can include an interference-aware segment 204 in addition to an interference-whitening segment 206.

The interference-whitening segment 206 can represent the capacity or ability for devices not recognizing, detecting, decoding, or a combination of processes thereof for the interference signal 118 of FIG. 1 in processing the serving signal 116 of FIG. 1. The interference-whitening segment 206 can be for the first user device 102 of FIG. 1, the second user device 104 of FIG. 1, or a combination thereof without or not utilizing the interference-aware receiver 114.

For example, the interference-whitening segment 206 can represent achievable communication rates when utilizing interference whitening process, blind interference removal process, or a combination thereof. Also for example, the interference-whitening segment 206 can represent achievable communication rates when processing the interference signal 118 as included in the noise portion, as represented by the SINR 152 of FIG. 1.

The interference-aware segment 204 is a measurement of the overall capacity or ability to process the receiver signal 134 of FIG. 1 for a device recognizing, detecting, decoding, or a combination of processes thereof for the interference signal 118 in processing the serving signal 116. The interference-aware segment 204 can be greater than or in addition to the interference-whitening segment 206. The interference-aware segment 204 can be the measurement for the first user device 102, the second user device 104, or a combination thereof with or utilizing the interference-aware receiver 114.

For example, the interference-aware segment 204 can represent achievable communication rates when utilizing the interference-aware receiver 114, such as joint-detection of serving and interference data or successive decoding of serving data based on recognizing the interference data. Also for example, the interference-aware segment 204 can represent the improvement in the communication rate resulting from distinguishing the interference signal 118 from the noise portion and processing for the serving signal 116 without utilizing the SINR 152.

The interference-aware segment 204 can be based on the interference communication capacity 132, the serving communication capacity 130, or a combination thereof. The interference communication capacity 132, or an estimate thereof, can be represented along a horizontal direction or axis. The serving communication capacity 130, or an estimate thereof, can be represented along a vertical direction or axis. The serving communication capacity 130 can remain constant, decrease, or a combination thereof as the interference communication capacity 132 increases.

The interference-aware segment 204 can be based on the interference signal 118 or processing thereof as associated with the interference-aware receiver 114. The interference-aware segment 204 can include an interference-free rate 208, a partial-recognition rate 210, an interference-whitening rate 212, or a combination thereof.

The interference-free rate 208 is a representation of overall processing capacity or ability based on fully recognizing, detecting, decoding, or a combination of processes thereof for the interference signal 118. The interference-free rate 208 can be a maximum value or limit or a range of values up to and including the maximum value or limit for the serving communication capacity 130.

The partial-recognition rate 210 is a representation of overall processing capacity or ability based on partially recognizing, detecting, decoding, or a combination of processes thereof for the interference signal 118. The partial-recognition rate 210 can be a combination of an ability to recognize, decode, detect, or a combination thereof for the interference signal 118, represented as '$R_{12}$', and a relationship between the interference-free rate 208 and the interference-whitening rate 212, represented as '$R_{1,Diag}$'. The partial-recognition rate 210 can be the processing capability for the interference signal 118 for the first user device 102, adjusted by the interference-free rate 208 and the interference-whitening rate 212.

The interference-whitening rate 212 is a representation of overall processing capacity or ability based on not recognizing, detecting, decoding, or a combination of processes thereof for the interference signal 118. The interference-whitening rate 212 can be a minimum value or limit or a range of values from and including the minimum value or limit for the serving communication capacity 130.

The communication rate profile 202 can be represented using a rate boundary set 214. The rate boundary set 214 can include a value or a coordinate for describing the communication rate profile 202. The rate boundary set 214 can describe an abstract location for describing the behavior or the complete set of values for the communication rate profile 202. For example, the rate boundary set 214 can represent corners, slopes, intersects, or a combination thereof for segments or portions within the communication rate profile 202.

Also for example, the rate boundary set 214 can include a serving maximum parameter, represented as '$C_{11}^{I-F}$', a serving minimum parameter, represented as '$C_{11}^{I-W}$', an interference maximum parameter, represented as '$C_{12}^{I-F}$', an interference minimum parameter, represented as '$C_{12}^{I-W}$', or a combination thereof. The serving maximum parameter can include the interference-free rate 208. The serving minimum parameter can include the interference-whitening rate 212. The interference maximum parameter and the interference minimum parameter can correspond to the ability or capability of the first user device 102 or the second user device 104 to process the interference signal 118, similar to the interference-free rate 208 and the interference-whitening rate 212.

The computing system 100 can calculate the rate boundary set 214. The computing system 100 can generate the communication rate profile 202 for the first user device 102, the second user device 104, or a combination thereof. The computing system 100 can generate the communication rate profile 202 based on the rate boundary set 214. Details regarding the communication rate profile 202 and the rate boundary set 214 will be described below.

Figure 3:
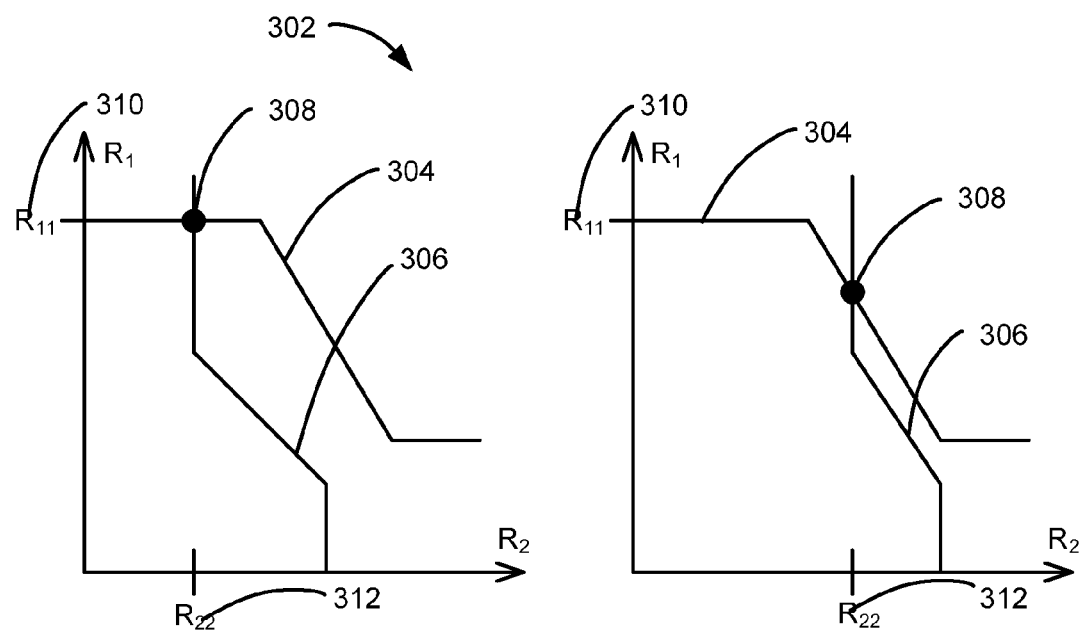
FIG. 3 is an exemplary illustration of a rate coordination profile for the computing system of FIG. 1.

Referring now to FIG. 3, therein is shown an exemplary illustration of a rate coordination profile 302 for the computing system 100 of FIG. 1. The rate coordination profile 302 is a characterization of capacity or ability corresponding to multiple devices affecting exchange of information thereto.

The rate coordination profile 302 can represent a relationship between the capacity or ability for processing received signals for the first user device 102 of FIG. 1 and the second user device 104 of FIG. 1. The rate coordination profile 302 can include a serving rate profile 304 and an interference rate profile 306.

The serving rate profile 304 is the communication rate profile 202 of FIG. 2 corresponding to the first user device 102. The serving rate profile 304 can be represented as a continuous line extending from and along a generally perpendicular direction away from the vertical axis as shown in FIG. 3.

The interference rate profile 306 is the communication rate profile 202 corresponding to the second user device 104. The interference rate profile 306 can be represented as a continuous line extending from and along a generally perpendicular direction away from the horizontal axis as shown in FIG. 3. The interference rate profile 306 can be generally parallel to the horizontal axis corresponding to the first user device 102.

For example, from the perspective of the first node device 106 of FIG. 1, the serving rate profile 304 can include the communication rate profile 202 for the first user device 102 intended as the recipient of the serving signal 116 of FIG. 1. Similarly, the interference rate profile 306 can include the communication rate profile 202 for the second user device 104 affecting transmission of the interference signal 118 of FIG. 1, unintentionally received at the first user device 102.

The rate coordination profile 302 can overlay or combine the serving rate profile 304 and the interference rate profile 306. The rate coordination profile 302 can include a rate intersection 308 where the serving rate profile 304 and the interference rate profile 306 overlap or meet.

The rate intersection 308 can include a serving rate estimate 310 and an interference rate estimate 312 describing the abstract location of the overlap or the meeting point. The rate intersection can include the serving rate estimate 310 corresponding to the serving communication capacity 130 of FIG. 1 and the interference rate estimate 312 corresponding to the interference communication capacity 132 of FIG. 1.

The rate intersection 308 can include paired values of the serving communication capacity 130 and the interference rate estimate 312 occurring in both the serving rate profile 304 and the interference rate profile 306. The rate intersection 308 can describe an estimation for the serving communication capacity 130 and the interference communication capacity 132 likely to occur in simultaneously communicating the serving signal 116 and the interference signal 118, the rates supportable by both the first user device 102 and the second user device 104, or a combination thereof.

The rate intersection 308 can further represent a dynamic or a relationship caused by the capability of the first user device 102 and the second user device 104. Moreover, the rate intersection 308 can represent a likely relationship or a likely interaction associated with a value or an instance of the beam-forming mechanism 138 of FIG. 1, the power-allocation mechanism 140 of FIG. 1, or a combination thereof.

The rate coordination profile 302 can be based on the serving channel measure 124 of FIG. 1, the interference channel measure 128 of FIG. 1, channel measures from the perspective of communicating between the second user device 104 and the second node device 108 of FIG. 1, or a combination thereof. The two instances of the rate coordination profile 302 can represent changes in the rate coordination profile 302 resulting from changes in the serving channel measure 124, the interference channel measure 128, channel measures from the perspective of communicating between the second user device 104 and the second node device 108, or a combination thereof. Details regarding the rate coordination profile 302 will be described below.

Figure 4:
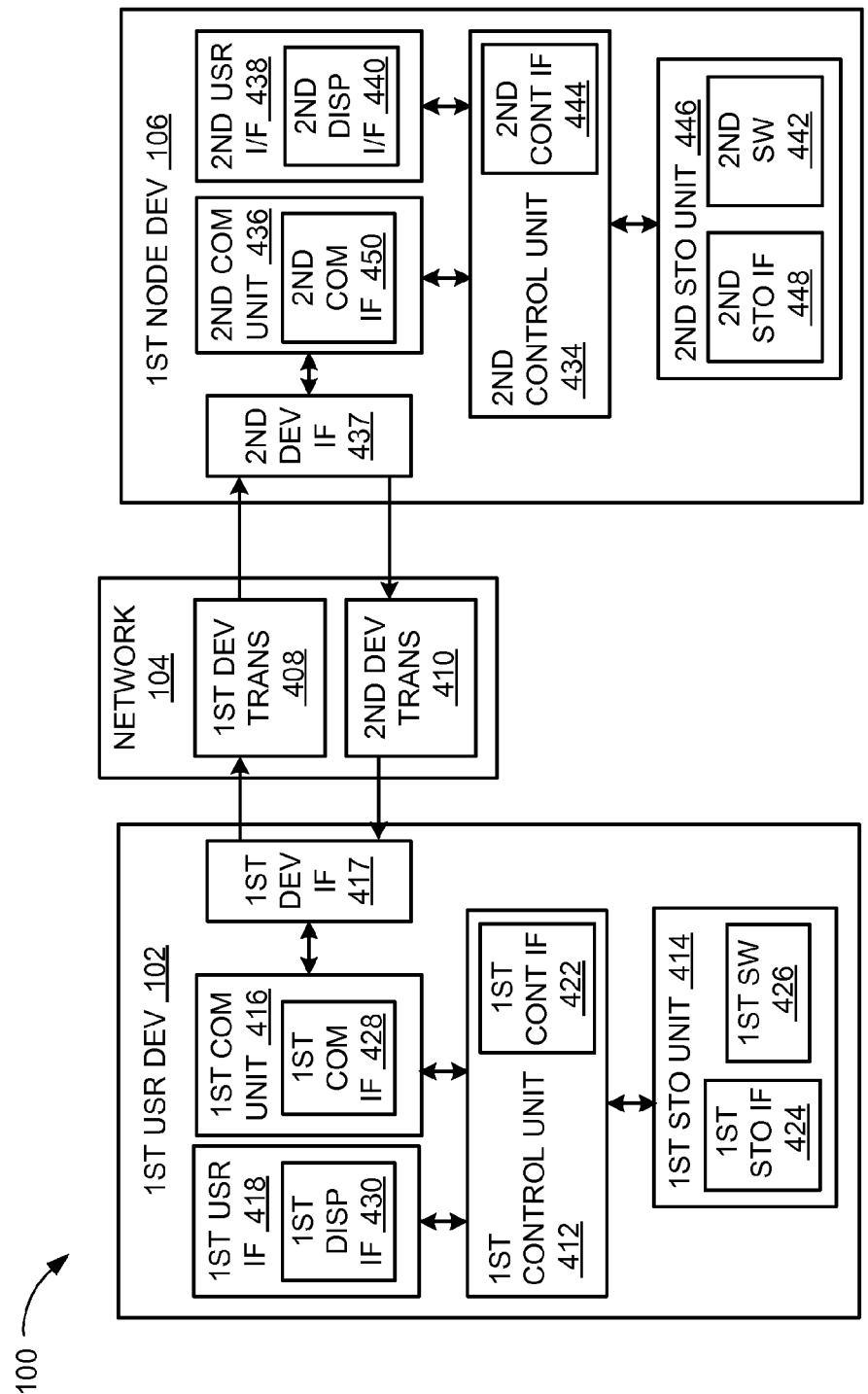
FIG. 4 is an exemplary block diagram of the computing system.

Referring now to FIG. 4, therein is shown an exemplary block diagram of the computing system 100. The computing system 100 can include the first user device 102, the network 110, and the first node device 106. The first user device 102 can send information in a first device transmission 408 over the network 110 to the first node device 106. The first node device 106 can send information in a second device transmission 410 over the network 110 to the first user device 102.

For illustrative purposes, the computing system 100 is shown with the first user device 102 as a client device, although it is understood that the computing system 100 can have the first user device 102 as a different type of device. For example, the first user device 102 can be a server having a display interface.

Also for illustrative purposes, the computing system 100 is shown with the first node device 106 as a server, although it is understood that the computing system 100 can have the first node device 106 as a different type of device. For example, the first node device 106 can be a client device.

For brevity of description in this embodiment of the present invention, the first user device 102 will be described as a client device and the first node device 106 will be described as a server device. The embodiment of the present invention is not limited to this selection for the type of devices. The selection is an example of an embodiment of the present invention.

The first user device 102 can include a first control unit 412, a first storage unit 414, a first communication unit 416, and a first user interface 418. The first control unit 412 can include a first control interface 422. The first control unit 412 can execute a first software 426 to provide the intelligence of the computing system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first user device 102. The first control interface 422 can also be used for communication that is external to the first user device 102.

The first control interface 422 can receive information from the other functional units or from external sources, or can transmit information to the other functional units or to external destinations. The external sources and the external destinations refer to sources and destinations external to the first user device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first user device 102. The first storage interface 424 can also be used for communication that is external to the first user device 102.

The first storage interface 424 can receive information from the other functional units or from external sources, or can transmit information to the other functional units or to external destinations. The external sources and the external destinations refer to sources and destinations external to the first user device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first user device 102. For example, the first communication unit 416 can permit the first user device 102 to communicate with the first node device 106, a different device, an attachment, such as a peripheral device or a desktop computer, the network 110, or a combination thereof.

The first communication unit 416 can also function as a communication hub allowing the first user device 102 to function as part of the network 110 and not limited to be an end point or terminal unit to the network 110. The first communication unit 416 can include active and passive components, such as microelectronics or an antenna, for interaction with the network 110.

The first communication unit 416 can include a baseband device or component, a modem, a digital signal processor, or a combination thereof for transmitting, formatting, receiving, detecting, decoding, further processing, or a combination thereof for communication signals. The first communication unit 416 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 416 can further include one or more portions for storing information, such as cache or RAM memory, registers, or a combination thereof.

The first communication unit 416 can be coupled with a first inter-device interface 417. The first inter-device interface 417 can be a device or a portion of a device for physically communicating signals with a separate device. The first inter-device interface 417 can communicate by transmitting or receiving signals to or from another device. The first inter-device interface 417 can include one or more antennas for wireless signals, a physical connection and receiver-transmitter for wired signals, or a combination thereof. The first inter-device interface 417 can include an omnidirectional antenna, a wire, an antenna chip, a ceramic antenna, or a combination thereof. The first inter-device interface 417 can further include a port, a wire, a repeater, a connector, a filter, a sensor, or a combination thereof.

The first inter-device interface 417 can detect or respond to a power in electromagnetic waves and provide the detected result to the first communication unit 416 to receive a signal, including the second device transmission 410. The first inter-device interface 417 can provide a path or respond to currents or voltages provided by the first communication unit 416 to transmit a signal, including the first device transmission 408.

The first communication unit 416 can include a first communication interface 428. The first communication interface 428 can be used for communication between the first communication unit 416 and other functional units in the first user device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first user device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control unit 412 can operate the first user interface 418 to display information generated by the computing system 100. The first control unit 412 can also execute the first software 426 for the other functions of the computing system 100. The first control unit 412 can further execute the first software 426 for interaction with the network 110 via the first communication unit 416.

The first node device 106 can be optimized for implementing an embodiment of the present invention in a multiple device embodiment with the first user device 102. The first node device 106 can provide the additional or higher performance processing power compared to the first user device 102. The first node device 106 can include a second control unit 434, a second communication unit 436, a second user interface 438, and a second storage unit 446.

The second user interface 438 allows a user (not shown) to interface and interact with the first node device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the first node device 106 of the computing system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the computing system 100, including operating the second communication unit 436 to communicate with the first user device 102 over the network 110.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the first node device 106. The second control interface 444 can also be used for communication that is external to the first node device 106.

The second control interface 444 can receive information from the other functional units or from external sources, or can transmit information to the other functional units or to external destinations. The external sources and the external destinations refer to sources and destinations external to the first node device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the information such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the computing system 100 is shown with the second storage unit 446 as a single hierarchy storage system, although it is understood that the computing system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the first node device 106. The second storage interface 448 can also be used for communication that is external to the first node device 106.

The second storage interface 448 can receive information from the other functional units or from external sources, or can transmit information to the other functional units or to external destinations. The external sources and the external destinations refer to sources and destinations external to the first node device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the first node device 106. For example, the second communication unit 436 can permit the first node device 106 to communicate with the first user device 102 over the network 110.

The second communication unit 436 can also function as a communication hub allowing the first node device 106 to function as part of the network 110 and not limited to be an end point or terminal unit to the network 110. The second communication unit 436 can include active and passive components, such as microelectronics or resistors, for interaction with the network 110.

The second communication unit 436 can include a baseband device or component, a modem, a digital signal processor, or a combination thereof for transmitting, formatting, receiving, detecting, decoding, further processing, or a combination thereof for communication signals. The second communication unit 436 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 436 can further include one or more portions for storing information, such as cache or RAM memory, registers, or a combination thereof.

The second communication unit 436 can be coupled with a second inter-device interface 437. The second inter-device interface 437 can be a device or a portion of a device for physically communicating signals with a separate device. The second inter-device interface 437 can communicate by transmitting or receiving signals to or from another device. The second inter-device interface 437 can include one or more antennas for wireless signals, a physical connection and receiver-transmitter for wired signals, or a combination thereof. The second inter-device interface 437 can include an omnidirectional antenna, a wire, an antenna chip, a ceramic antenna, or a combination thereof. The second inter-device interface 437 can further include a port, a wire, a repeater, a connector, a filter, a sensor, or a combination thereof.

The second inter-device interface 437 can detect or respond to a power in electromagnetic waves and provide the detected result to the second communication unit 436 to receive a signal, including the first device transmission 408. The second inter-device interface 437 can provide a path or respond to currents or voltages provided by the second communication unit 436 to transmit a signal, including the second device transmission 410.

The second communication unit 436 can include a second communication interface 450. The second communication interface 450 can be used for communication between the second communication unit 436 and other functional units in the first node device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the network 110 to send information to the first node device 106 in the first device transmission 408. The first node device 106 can receive information in the second communication unit 436 from the first device transmission 408 of the network 110.

The second communication unit 436 can couple with the network 110 to send information to the first user device 102 in the second device transmission 410. The first user device 102 can receive information in the first communication unit 416 from the second device transmission 410 of the network 110. The computing system 100 can be executed by the first control unit 412, the second control unit 434, or a combination thereof. For illustrative purposes, the first node device 106 is shown with the partition having the second user interface 438, the second storage unit 446, the second control unit 434, and the second communication unit 436, although it is understood that the first node device 106 can have a different partition. For example, the second software 442 can be partitioned differently such that some or all of its function can be in the second control unit 434 and the second communication unit 436. Also, the first node device 106 can include other functional units not shown in FIG. 4 for clarity.

The functional units in the first user device 102 can work individually and independently of the other functional units. The first user device 102 can work individually and independently from the first node device 106 and the network 110.

The functional units in the first node device 106 can work individually and independently of the other functional units. The first node device 106 can work individually and independently from the first user device 102 and the network 110.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first user device 102 and the first node device 106. It is understood that the first user device 102 and the first node device 106 can operate any of the modules and functions of the computing system 100.

Figure 5:
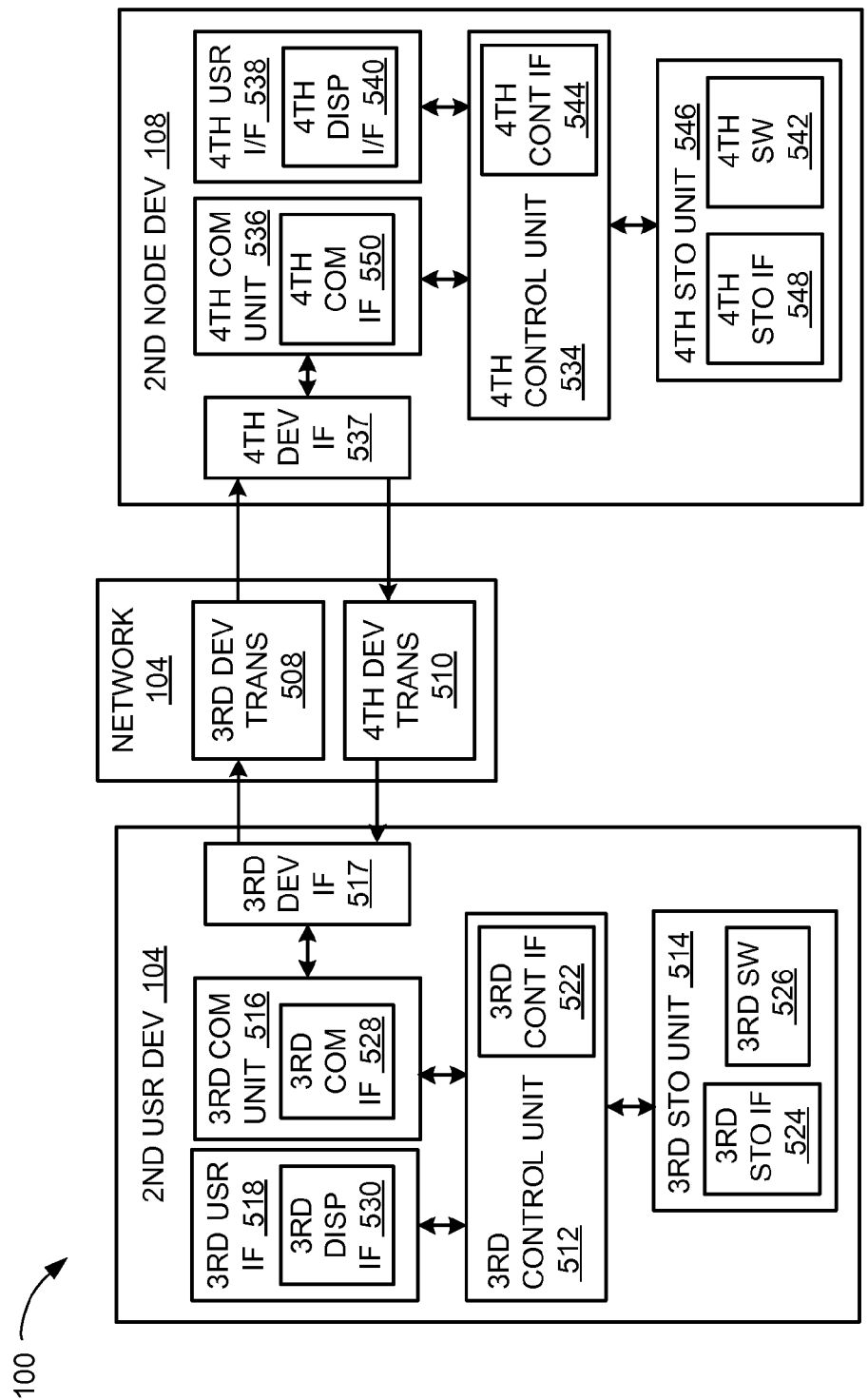
FIG. 5 is a further exemplary block diagram of the computing system.

Referring now to FIG. 5, therein is shown a further exemplary block diagram of the computing system 100. The computing system 100 can include the second user device 104, the network 110, and the second node device 108. The second user device 104 can send information in a third device transmission 508 over the network 110 to the second node device 108. The second node device 108 can send information in a fourth device transmission 510 over the network 110 to the second user device 104.

For illustrative purposes, the computing system 100 is shown with the second user device 104 as a client device, although it is understood that the computing system 100 can have the second user device 104 as a different type of device. For example, the second user device 104 can be a server having a display interface.

Also for illustrative purposes, the computing system 100 is shown with the second node device 108 as a server, although it is understood that the computing system 100 can have the second node device 108 as a different type of device. For example, the second node device 108 can be a client device.

For brevity of description in this embodiment of the present invention, the second user device 104 will be described as a client device and the second node device 108 will be described as a server device. The embodiment of the present invention is not limited to this selection for the type of devices. The selection is an example of an embodiment of the present invention.

The second user device 104 can include a third control unit 512, a third storage unit 514, a third communication unit 516, and a third user interface 518. The third control unit 512 can include a third control interface 522. The third control unit 512 can execute a third software 526 to provide the intelligence of the computing system 100.

The third control unit 512 can be implemented in a number of different manners. For example, the third control unit 512 can be a processor, an ASIC, an embedded processor, a microprocessor, a hardware control logic, a hardware FSM, a DSP, or a combination thereof. The third control interface 522 can be used for communication between the third control unit 512 and other functional units in the second user device 104. The third control interface 522 can also be used for communication that is external to the second user device 104.

The third control interface 522 can receive information from the other functional units or from external sources, or can transmit information to the other functional units or to external destinations. The external sources and the external destinations refer to sources and destinations external to the second user device 104.

The third control interface 522 can be implemented in different ways and can include different implementations depending on which functional units or external units are being interfaced with the third control interface 522. For example, the third control interface 522 can be implemented with a pressure sensor, an inertial sensor, a microelectromechanical system (MEMS), optical circuitry, waveguides, wireless circuitry, wireline circuitry, or a combination thereof.

The third storage unit 514 can store the third software 526. The third storage unit 514 can also store the relevant information, such as data representing incoming images, data representing previously presented image, sound files, or a combination thereof.

The third storage unit 514 can be a volatile memory, a nonvolatile memory, an internal memory, an external memory, or a combination thereof. For example, the third storage unit 514 can be a nonvolatile storage such as NVRAM, Flash memory, disk storage, or a volatile storage such as SRAM.

The third storage unit 514 can include a third storage interface 524. The third storage interface 524 can be used for communication between the third storage unit 514 and other functional units in the second user device 104. The third storage interface 524 can also be used for communication that is external to the second user device 104.

The third storage interface 524 can receive information from the other functional units or from external sources, or can transmit information to the other functional units or to external destinations. The external sources and the external destinations refer to sources and destinations external to the second user device 104.

The third storage interface 524 can include different implementations depending on which functional units or external units are being interfaced with the third storage unit 514. The third storage interface 524 can be implemented with technologies and techniques similar to the implementation of the third control interface 522.

The third communication unit 516 can enable external communication to and from the second user device 104. For example, the third communication unit 516 can permit the second user device 104 to communicate with the second node device 108, a different device, an attachment, such as a peripheral device or a desktop computer, the network 110, or a combination thereof.

The third communication unit 516 can also function as a communication hub allowing the second user device 104 to function as part of the network 110 and not limited to be an end point or terminal unit to the network 110. The third communication unit 516 can include active and passive components, such as microelectronics or an antenna, for interaction with the network 110.

The third communication unit 516 can include a baseband device or component, a modem, a digital signal processor, or a combination thereof for transmitting, formatting, receiving, detecting, decoding, further processing, or a combination thereof for communication signals. The third communication unit 516 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 516 can further include one or more portions for storing information, such as cache or RAM memory, registers, or a combination thereof.

The third communication unit 516 can be coupled with a third inter-device interface 517. The third inter-device interface 517 can be a device or a portion of a device for physically communicating signals with a separate device. The third inter-device interface 517 can communicate by transmitting or receiving signals to or from another device. The third inter-device interface 517 can include one or more antennas for wireless signals, a physical connection and receiver-transmitter for wired signals, or a combination thereof. The third inter-device interface 517 can include an omnidirectional antenna, a wire, an antenna chip, a ceramic antenna, or a combination thereof. The third inter-device interface 517 can further include a port, a wire, a repeater, a connector, a filter, a sensor, or a combination thereof.

The third inter-device interface 517 can detect or respond to a power in electromagnetic waves and provide the detected result to the third communication unit 516 to receive a signal, including the fourth device transmission 510. The third inter-device interface 517 can provide a path or respond to currents or voltages provided by the third communication unit 516 to transmit a signal, including the third device transmission 508.

The third communication unit 516 can include a third communication interface 528. The third communication interface 528 can be used for communication between the third communication unit 516 and other functional units in the second user device 104. The third communication interface 528 can receive information from the other functional units or can transmit information to the other functional units.

The third communication interface 528 can include different implementations depending on which functional units are being interfaced with the third communication unit 516. The third communication interface 528 can be implemented with technologies and techniques similar to the implementation of the third control interface 522.

The third user interface 518 allows a user (not shown) to interface and interact with the second user device 104. The third user interface 518 can include an input device and an output device. Examples of the input device of the third user interface 518 can include a keypad, a touchpad, soft-keys, a keyboard, a microphone, an infrared sensor for receiving remote signals, or any combination thereof to provide data and communication inputs.

The third user interface 518 can include a third display interface 530. The third display interface 530 can include an output device. The third display interface 530 can include a display, a projector, a video screen, a speaker, or any combination thereof.

The third control unit 512 can operate the third user interface 518 to display information generated by the computing system 100. The third control unit 512 can also execute the third software 526 for the other functions of the computing system 100. The third control unit 512 can further execute the third software 526 for interaction with the network 110 via the third communication unit 516.

The second node device 108 can be optimized for implementing an embodiment of the present invention in a multiple device embodiment with the second user device 104. The second node device 108 can provide the additional or higher performance processing power compared to the second user device 104. The second node device 108 can include a fourth control unit 534, a fourth communication unit 536, a fourth user interface 538, and a fourth storage unit 546.

The fourth user interface 538 allows a user (not shown) to interface and interact with the second node device 108. The fourth user interface 538 can include an input device and an output device. Examples of the input device of the fourth user interface 538 can include a keypad, a touchpad, soft-keys, a keyboard, a microphone, or any combination thereof to provide data and communication inputs. Examples of the output device of the fourth user interface 538 can include a fourth display interface 540. The fourth display interface 540 can include a display, a projector, a video screen, a speaker, or any combination thereof.

The fourth control unit 534 can execute a fourth software 542 to provide the intelligence of the second node device 108 of the computing system 100. The fourth software 542 can operate in conjunction with the third software 526. The fourth control unit 534 can provide additional performance compared to the third control unit 512.

The fourth control unit 534 can operate the fourth user interface 538 to display information. The fourth control unit 534 can also execute the fourth software 542 for the other functions of the computing system 100, including operating the fourth communication unit 536 to communicate with the second user device 104 over the network 110.

The fourth control unit 534 can be implemented in a number of different manners. For example, the fourth control unit 534 can be a processor, an embedded processor, a microprocessor, hardware control logic, a hardware FSM, a DSP, or a combination thereof.

The fourth control unit 534 can include a fourth control interface 544. The fourth control interface 544 can be used for communication between the fourth control unit 534 and other functional units in the second node device 108. The fourth control interface 544 can also be used for communication that is external to the second node device 108.

The fourth control interface 544 can receive information from the other functional units or from external sources, or can transmit information to the other functional units or to external destinations. The external sources and the external destinations refer to sources and destinations external to the second node device 108.

The fourth control interface 544 can be implemented in different ways and can include different implementations depending on which functional units or external units are being interfaced with the fourth control interface 544. For example, the fourth control interface 544 can be implemented with a pressure sensor, an inertial sensor, a microelectromechanical system (MEMS), optical circuitry, waveguides, wireless circuitry, wireline circuitry, or a combination thereof.

A fourth storage unit 546 can store the fourth software 542. The fourth storage unit 546 can also store the information such as data representing incoming images, data representing previously presented image, sound files, or a combination thereof. The fourth storage unit 546 can be sized to provide the additional storage capacity to supplement the third storage unit 514.

For illustrative purposes, the fourth storage unit 546 is shown as a single element, although it is understood that the fourth storage unit 546 can be a distribution of storage elements. Also for illustrative purposes, the computing system 100 is shown with the fourth storage unit 546 as a single hierarchy storage system, although it is understood that the computing system 100 can have the fourth storage unit 546 in a different configuration. For example, the fourth storage unit 546 can be formed with different storage technologies forming a memory hierarchal system including different levels of caching, main memory, rotating media, or off-line storage.

The fourth storage unit 546 can be a volatile memory, a nonvolatile memory, an internal memory, an external memory, or a combination thereof. For example, the fourth storage unit 546 can be a nonvolatile storage such as NVRAM, Flash memory, disk storage, or a volatile storage such as SRAM.

The fourth storage unit 546 can include a fourth storage interface 548. The fourth storage interface 548 can be used for communication between the fourth storage unit 546 and other functional units in the second node device 108. The fourth storage interface 548 can also be used for communication that is external to the second node device 108.

The fourth storage interface 548 can receive information from the other functional units or from external sources, or can transmit information to the other functional units or to external destinations. The external sources and the external destinations refer to sources and destinations external to the second node device 108.

The fourth storage interface 548 can include different implementations depending on which functional units or external units are being interfaced with the fourth storage unit 546. The fourth storage interface 548 can be implemented with technologies and techniques similar to the implementation of the fourth control interface 544.

The fourth communication unit 536 can enable external communication to and from the second node device 108. For example, the fourth communication unit 536 can permit the second node device 108 to communicate with the second user device 104 over the network 110.

The fourth communication unit 536 can also function as a communication hub allowing the second node device 108 to function as part of the network 110 and not limited to be an end point or terminal unit to the network 110. The fourth communication unit 536 can include active and passive components, such as microelectronics or resistors, for interaction with the network 110.

The fourth communication unit 536 can include a baseband device or component, a modem, a digital signal processor, or a combination thereof for transmitting, formatting, receiving, detecting, decoding, further processing, or a combination thereof for communication signals. The fourth communication unit 536 can include one or more portions for processing the voltages, the currents, the digital information, or a combination thereof, such as an analog-to-digital converter, a digital-to-analog converter, a filter, an amplifier, a processor-type circuitry, or a combination thereof. The fourth communication unit 536 can further include one or more portions for storing information, such as cache or RAM memory, registers, or a combination thereof.

The fourth communication unit 536 can be coupled with a fourth inter-device interface 537. The fourth inter-device interface 537 can be a device or a portion of a device for physically communicating signals with a separate device. The fourth inter-device interface 537 can communicate by transmitting or receiving signals to or from another device. The fourth inter-device interface 537 can include one or more antennas for wireless signals, a physical connection and receiver-transmitter for wired signals, or a combination thereof. The fourth inter-device interface 537 can include an omnidirectional antenna, a wire, an antenna chip, a ceramic antenna, or a combination thereof. The fourth inter-device interface 537 can further include a port, a wire, a repeater, a connector, a filter, a sensor, or a combination thereof.

The fourth inter-device interface 537 can detect or respond to a power in electromagnetic waves and provide the detected result to the fourth communication unit 536 to receive a signal, including the third device transmission 508. The fourth inter-device interface 537 can provide a path or respond to currents or voltages provided by the fourth communication unit 536 to transmit a signal, including the fourth device transmission 510.

The fourth communication unit 536 can include a fourth communication interface 550. The fourth communication interface 550 can be used for communication between the fourth communication unit 536 and other functional units in the second node device 108. The fourth communication interface 550 can receive information from the other functional units or can transmit information to the other functional units.

The fourth communication interface 550 can include different implementations depending on which functional units are being interfaced with the fourth communication unit 536. The fourth communication interface 550 can be implemented with technologies and techniques similar to the implementation of the fourth control interface 544.

The third communication unit 516 can couple with the network 110 to send information to the second node device 108 in the third device transmission 508. The second node device 108 can receive information in the fourth communication unit 536 from the third device transmission 508 of the network 110.

The fourth communication unit 536 can couple with the network 110 to send information to the second user device 104 in the fourth device transmission 510. The second user device 104 can receive information in the third communication unit 516 from the fourth device transmission 510 of the network 110. The computing system 100 can be executed by the third control unit 512, the fourth control unit 534, or a combination thereof. For illustrative purposes, the second node device 108 is shown with the partition having the fourth user interface 538, the fourth storage unit 546, the fourth control unit 534, and the fourth communication unit 536, although it is understood that the second node device 108 can have a different partition. For example, the fourth software 542 can be partitioned differently such that some or all of its function can be in the fourth control unit 534 and the fourth communication unit 536. Also, the second node device 108 can include other functional units not shown in FIG. 5 for clarity.

The functional units in the second user device 104 can work individually and independently of the other functional units. The second user device 104 can work individually and independently from the second node device 108 and the network 110.

The functional units in the second node device 108 can work individually and independently of the other functional units. The second node device 108 can work individually and independently from the second user device 104 and the network 110.

The functional units described above can be implemented in hardware. For example, one or more of the functional units can be implemented using the a gate, circuitry, a processor, a computer, integrated circuit, integrated circuit cores, a pressure sensor, an inertial sensor, a MEMS, a passive device, a physical non-transitory memory medium having instructions for performing the software function, a portion therein, or a combination thereof.

For illustrative purposes, the computing system 100 is described by operation of the second user device 104 and the second node device 108. It is understood that the second user device 104 and the second node device 108 can operate any of the modules and functions of the computing system 100.

Figure 6:
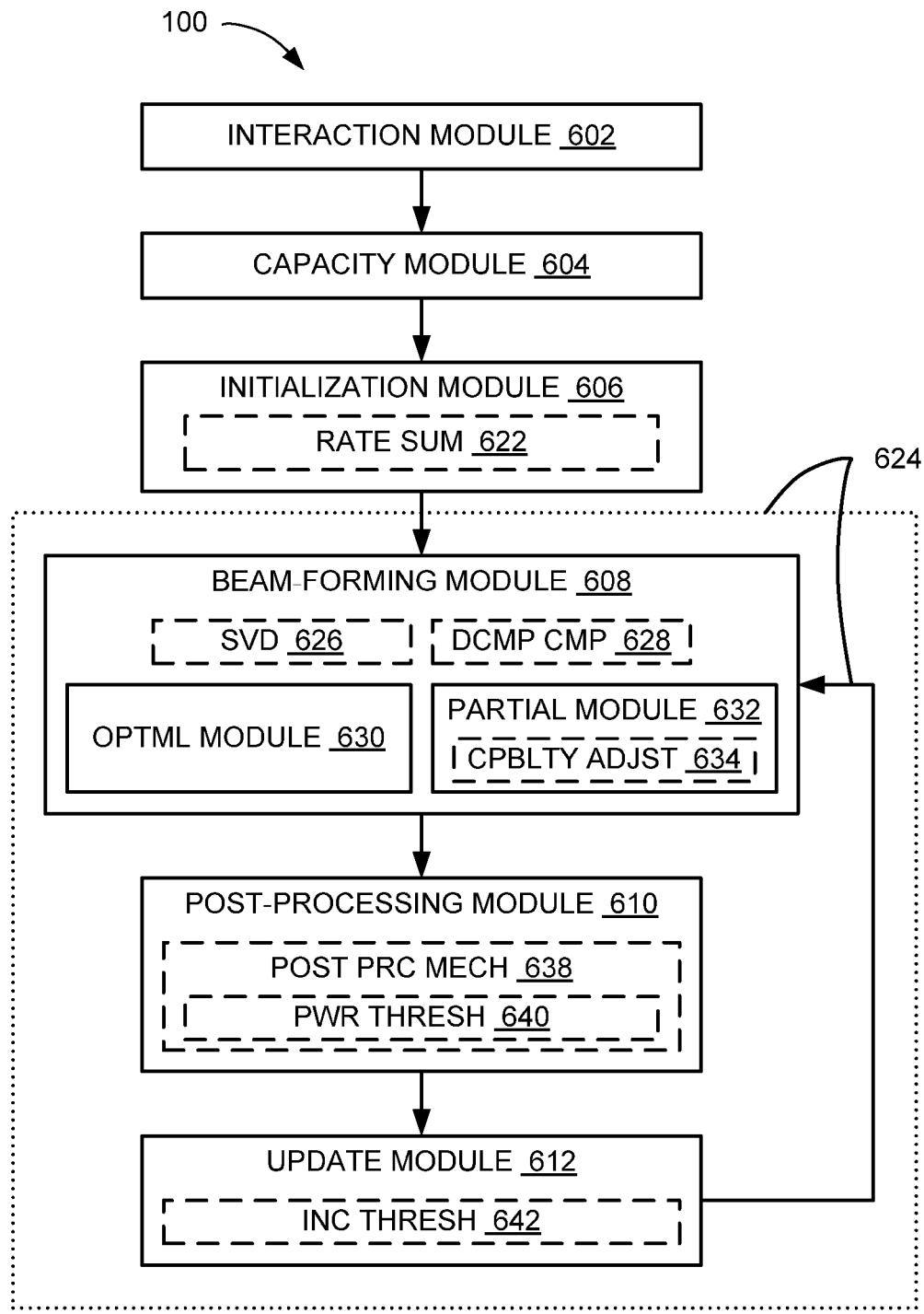
FIG. 6 is a control flow of the computing system.

Referring now to FIG. 6, therein is shown a control flow of the computing system 100. The computing system 100 can include an interaction module 602, a capacity module 604, an initialization module 606, a beam-forming module 608, a post-processing module 610, an update module 612, or a combination thereof.

The interaction module 602 can be coupled with the capacity module 604, which can be further coupled with the initialization module 606. The initialization module 606 can be coupled with the beam-forming module 608, the update module 612, or a combination thereof. The beam-forming module 608 can be coupled with the post-processing module 610, which can be further coupled to the update module 612.

The modules can be coupled to each other in a variety of ways. For example, modules can be coupled by having the input of one module connected to the output of another, such as by using wired or wireless connections, the network 110 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the interaction module 602 can be connected to one or more inputs or inputs of the capacity module 604 using conductors or the transmission channel without intervening modules or devices there-between. Also for example, the capacity module 604 can be coupled to the initialization module 606 directly, similar to the interaction module 602 and the capacity module 604, or indirectly using a wireless channel with a repeater, a switch, a routing device, or a combination thereof. The initialization module 606, the beam-forming module 608, the post-processing module 610, the update module 612, or a combination thereof can be coupled in similar ways.

The computing system 100 can communicate with or using a device, such as by displaying images, recreating sounds, exchanging process steps or instructions, or a combination thereof. The computing system 100 can communicate information between devices. The receiving device can further communicate with the user by displaying images, recreating sounds, exchanging process steps or instructions, or a combination thereof according to the information communicate to the device.

The interaction module 602 is configured to communicate peripheral information for communicating the serving signal 116 of FIG. 1, the interference signal 118 of FIG. 1, or a combination thereof between devices. The interaction module 602 can communicate between the first user device 102 of FIG. 1, the second user device 104 of FIG. 1, the first node device 106 of FIG. 1, the second node device 108 of FIG. 1, or a combination thereof.

The interaction module 602 can communicate using the node link 112 of FIG. 1, the serving channel, the interference channel, or a combination thereof. The interaction module 602 can communicate the peripheral information by communicating the coordination report 154 of FIG. 1.

The interaction module 602 can communicate the coordination report 154 by receiving the feedback report 158 of FIG. 1, the inter-node report 160 of FIG. 1, or a combination thereof. The interaction module 602 can use the first inter-device interface 417 of FIG. 4, the second inter-device interface 437 of FIG. 4, the third inter-device interface 517 of FIG. 5, the fourth inter-device interface 537 of FIG. 5, or a combination thereof.

The interaction module 602 can receive the feedback report 158 from the first user device 102 through the first node device 106, from the second user device 104 through the second node device 108, or a combination thereof. The interaction module 602 can further exchange the feedback report 158 between the first node device 106 and the second node device 108 through the inter-node report 160.

For example, the interaction module 602 can receive, exchange, or a combination thereof for identification information for the first user device 102, identification information for the second user device 104, the serving channel measure 124 of FIG. 1, the interference channel measure 128 of FIG. 1, the comprehensive signal measure 150 of FIG. 1, the CQI, or a combination thereof. Also for example, the interaction module 602 can receive, exchange, or a combination thereof for measured or determined instance of the serving communication capacity 130 of FIG. 1, the interference communication capacity 132 of FIG. 1, the communication rate profile 202 of FIG. 2, the rate coordination profile 302 of FIG. 3, or a combination thereof corresponding to preceding instance of the serving signal 116, the interference signal 118, or a combination thereof.

As a more specific example, from the perspective of the first node device 106, the interaction module 602 can communicate the coordination report 154 to the first node device 106 for representing the receiver signal 134 of FIG. 1 received at the first user device 102. The interaction module 602 can communicate the coordination report 154 associated with the first user device 102 including the interference-aware receiver 114 of FIG. 1 capable of recognizing and further processing the interference signal 118 from the second node device 108, and included in the receiver signal 134.

The interaction module 602 can further receive, exchange, or a combination thereof for the beam-forming mechanism 138 of FIG. 1, the power-allocation mechanism 140 of FIG. 1, or a combination thereof. For example, the first node device 106 and the second node device 108 can exchange the first beam mechanism 142 of FIG. 1, the second beam mechanism 144 of FIG. 1, the first power mechanism 146 of FIG. 1, the second power mechanism 148 of FIG. 1, or a combination thereof.

The interaction module 602 can communicate by producing and detecting changes in energy representing data or information. The interaction module 602 can communicate by storing the energy or the changes therein in the first communication unit 416 of FIG. 4, the second communication unit 436 of FIG. 4, the third communication unit 516 of FIG. 5, the fourth communication unit 536 of FIG. 5, the first storage unit 414 of FIG. 4, the second storage unit 446 of FIG. 4, the third storage unit 514 of FIG. 5, the fourth storage unit 546 of FIG. 5, or a combination thereof.

After communicating the peripheral information, the control flow can pass to the capacity module 604. The control flow can pass through a variety of ways. For example, control flow can pass by having processing results of one module passed to another module, such as by passing the coordination report 154 from the interaction module 602 to the capacity module 604, by storing the processing results at a location known and accessible to the other module, such as by storing the coordination report 154 at a storage location known and accessible to the capacity module 604, by notifying the other module, such as by using a flag, an interrupt, a status signal, or a combination for the capacity module 604, or a combination of processes thereof.

The capacity module 604 is configured to determine capabilities of the devices and the relationship between the capabilities. The capacity module 604 can generate the rate coordination profile 302 for coordinating between the first node device 106 and the second node device 108 the communication of the interference signal 118 with the serving signal 116. The capacity module 604 can determine the rate coordination profile 302 based on the coordination report 154.

The capacity module 604 can generate the rate coordination profile 302 based on calculating the communication rate profile 202. The capacity module 604 can generate the rate coordination profile 302 based on calculating the communication rate profile 202 including the interference-aware segment 204 of FIG. 2.

The capacity module 604 can calculate the communication rate profile 202 including the interference-aware segment 204 beyond the interference-whitening segment 206 of FIG. 2. The capacity module 604 can calculate the communication rate profile 202 corresponding to the interference-aware receiver 114.

The capacity module 604 can calculate the serving rate profile 304 of FIG. 3 as the communication rate profile 202 for representing the first user device 102 processing for the serving signal 116, processing along with recognizing the interference signal 118, or a combination thereof. The capacity module 604 can further calculate the interference rate profile 306 of FIG. 3 as the communication rate profile 202 for representing the second user device 104 processing for the interference signal 118, processing along with recognizing the serving signal 116 acting as interference, or a combination thereof.

From the perspective of the serving signal 116, the capacity module 604 can calculate the communication rate profile 202 focusing on communication between the first user device 102 the first node device 106 as the serving rate profile 304. Also from the perspective of the serving signal 116, the capacity module 604 can calculate the communication rate profile 202 focusing on communication between the second user device 104 the second node device 108 as the interference rate profile 306.

The capacity module 604 can calculate the communication rate profile 202 by calculating the rate boundary set 214 of FIG. 2. The capacity module 604 can further calculate the interference-free rate 208 of FIG. 2, the partial-recognition rate 210 of FIG. 2, the interference-whitening rate 212 of FIG. 2, or a combination thereof.

The capacity module 604 can calculate the rate boundary set 214 according to:

$$C_{11}^{I-F} = \log_2 |I_{N_r} + \tilde{H}_{11}\tilde{H}_{11}^\dagger|. \quad \text{Equation (3).}$$

$$C_{11}^{I-W} = \log_2 |I_{N_r} + (I_{N_r} + \tilde{H}_{12}\tilde{H}_{12}^\dagger)^{-1}\tilde{H}_{11}\tilde{H}_{11}^\dagger|. \quad \text{Equation (4).}$$

$$C_{12}^{I-F} = \log_2 |I_{N_r} + \tilde{H}_{12}\tilde{H}_2^\dagger| \quad \text{Equation (5).}$$

$$C_{12}^{I-W} = \log_2 |I_{N_r} + (I_{N_r} + \tilde{H}_{11}\tilde{H}_{11}^\dagger)^{-1}\tilde{H}_{12}\tilde{H}_{12}^\dagger|. \quad \text{Equation (6).}$$

The serving maximum parameter can be represented as '$C_{11}^{I-F}$', the serving minimum parameter, represented as '$C_{11}^{I-W}$', the interference maximum parameter, represented as '$C_{12}^{I-F}$', and the interference minimum parameter, represented as '$C_{12}^{I-W}$'.

The term '$I_{N_r}$' can represent an identity matrix having a size represented by '$N_r$' corresponding to a size of the receiver signal 134. The size can be based on a number of antennas or a capacity of a device receiving signals, such as the first device interface 417, the second device interface 437, the third device interface 517, the fourth device interface 537, or a combination thereof transmitting the serving signal 116 or the interference signal 118.

The term '$\tilde{H}_{11}$' can represent the serving channel measure 124 from the perspective of the receiving device, such as the first user device 102, communicated with the coordination report 154. Similarly, the term '$\tilde{H}_{12}$' can represent the interference channel measure 128 from the perspective of the first user device 102. The notation '†' can represent a complex conjugate for the corresponding matrix or value.

The capacity module 604 can further calculate the interference-free rate 208 as the serving maximum parameter, such as based on Equation (3). The capacity module 604 can calculate the interference-whitening rate 212 the serving minimum parameter, such as based on Equation (4).

The serving communication capacity 130 for the first user device 102 can increase up to the interference-free rate 208. The serving communication capacity 130 can be at least larger than or equal to the interference-whitening rate 212.

The capacity module 604 can further calculate the partial-recognition rate 210. The capacity module 604 can calculate the partial-recognition rate 210 based on connecting or describing a relationship between the corner points or values resulting from Equations (3)-(6). For example, the partial-recognition rate 210 can be based on a diagonal line connecting ($C_{12}^{I-W}$, $C_{11}^{I-F}$) and ($C_{12}^{I-F}$, $C_{11}^{I-W}$) and having a slope of −1.

Also for example, the capacity module 604 can calculate the partial-recognition rate 210 based on:

$$R_{11} = R_{1,diag} - R_{12}. \quad \text{Equation (7).}$$

The term '$R_{1,diag}$' can represent an interference recognition capacity. The interference recognition capacity can be based on:

$$R_{1,diag} = C_{12}^{I-W} + C_{11}^{I-F} \quad \text{Equation (8).}$$

The interference recognition capacity can be based on the interference minimum parameter and the serving maximum parameter of the rate boundary set 214.

The interference recognition capacity can be further based on:

$$R_{1,diag} = \log_2|I_{N_r} + \tilde{H}_{12}\tilde{H}_{12}^\dagger + \tilde{H}_{11}\tilde{H}_{11}^\dagger| = \log_2|I_{N_r} + \tilde{H}_{12}Q_2\tilde{H}_{12}^\dagger + \tilde{H}_{11}Q_1 H_{11}^\dagger| \quad \text{Equation (9).}$$

The term '$Q_i$' can represent a conjugate symmetric Hermitian value or matrix based on:

$$Q_i = W_i P_i^\dagger P_i W_i^\dagger. \quad \text{Equation (10).}$$

The capacity module 604 can generate the rate coordination profile 302 by combining or overlaying the serving rate profile 304 and the interference rate profile 306. The capacity module 604 can determine the rate intersection 308 of FIG. 3 including the serving rate estimate 310 of FIG. 3 and the interference rate estimate 312 of FIG. 3.

The capacity module 604 can determine the rate intersection 308 as common set of rates, values, capacities, or a combination thereof common in both the serving rate profile 304 and the interference rate profile 306. The capacity module 604 can determine the serving rate estimate 310 and the interference rate estimate 312 as the rate or the capacity corresponding to the first user device 102 and the second user device 104, respectively.

The capacity module 604 can generate the rate coordination profile 302 using the first communication unit 416, the second communication unit 436, the third communication unit 516, the fourth communication unit 536, the first control unit 412 of FIG. 4, the second control unit 434 of FIG. 4, the third control unit 512 of FIG. 5, the fourth control unit 534 of FIG. 5, or a combination thereof. The capacity module 604 can store the rate coordination profile 302 or a component therein in the first communication unit 416, the second communication unit 436, the third communication unit 516, the fourth communication unit 536, the first storage unit 414, the second storage unit 446, the third storage unit 514, the fourth storage unit 546, or a combination thereof.

It has been discovered that the communication rate profile 202 including the interference-aware segment 204 for characterizing the interference-aware receiver 114 provides increased communication rate. The interference-aware segment 204 can account for the increased processing capacity of the interference-aware receiver 114, which can be utilized to improve the overall communication and allow for coordination with other base stations communicating the interference signal 118.

It has also been discovered that the rate coordination profile 302 including the rate intersection 308 between the serving rate profile 304 and the interference rate profile 306 provides increased robustness without increasing complexity. The rate coordination profile 302 and the rate intersection 308 can describe and capture an interaction between multiple signals, which can be utilized to coordinate and improve the communication of multiple signals from multiple base stations. Moreover, the computing system 100 can use the node link 112 and protocols already existing in communication standards for the rate coordination profile 302.

After generating the rate coordination profile 302, the control flow can be passed from the capacity module 604 to the initialization module 606. The control flow can pass similarly as described above between the interaction module 602 and the capacity module 604 but using processing results of the capacity module 604, such as the rate coordination profile 302.

The initialization module 606 is configured to provide initial values in coordinating communications for the first node device 106 and the second node device 108. The initialization module 606 can initialize the beam-forming mechanism 138, the power-allocation mechanism 140, or a combination thereof.

The initialization module 606 can initialize the first beam mechanism 142, the second beam mechanism 144, or a combination thereof as an identity value or matrix. The initialization module 606 can initialize the first beam mechanism 142, the second beam mechanism 144, or a combination thereof based on:

$$W_i = I_{N_s}, \forall i = 1, 2. \qquad \text{Equation (11)}.$$

The term '$I_{N_s}$' can be based on:

$$E[x_i x_i^\dagger] = I_{N_s}. \qquad \text{Equation (12)}.$$

The term '$N_s$' can represent a quantity or a number of symbols or streams in a group from a transmit signal vector at each subcarrier, such as for the data stream 120 of FIG. 1 in the serving signal 116.

The initialization module 606 can further initialize the first power mechanism 146, the second power mechanism 148, or a combination thereof based on a scaled identify value or matrix. The initialization module 606 can initialize the first power mechanism 146, the second power mechanism 148, or a combination thereof based on:

$$P_i := \sqrt{\frac{\rho_i}{N_s}} I_{N_t}, \qquad \text{Equation (13)}$$

$$\forall i = 1, 2.$$

The term '$N_e$' can represent a number of antennas or a capacity of a device transmitting signals, such as the first device interface 417, the second device interface 437, the third device interface 517, the fourth device interface 537, or a combination thereof transmitting the serving signal 116 or the interference signal 118. The term '$\rho_i$' can represent the comprehensive signal measure 150. For example, '$\rho_1$' can represent SNR based on '$\|P_1\|_{fro}^2$'. Also for example, '$\rho_2$' can represent INR based on '$\|P_2\|_{fro}^2$'. Also for example, '$\rho_i$' can be based on the coordination report 154.

The initialization module 606 can initially calculate a rate sum 622. The rate sum 622 is a combination of the serving rate estimate 310 and the interference rate estimate 312 for representing the serving communication capacity 130 and the interference communication capacity 132 respectively. The initialization module 606 can calculate the rate sum 622 based on adding the serving rate estimate 310 and the interference rate estimate 312 as calculated by the capacity module 604. The computing system 100 can use the rate sum 622 as a test condition for coordinating and optimizing communication of the serving signal 116 and the interference signal 118.

The initialization module 606 can further initialize for an iterative coordination mechanism 624. The iterative coordination mechanism 624 is a process or a method for repetitively interacting with or between the first node device 106 and the second node device 108 for optimally communicating the serving signal 116 and the interference signal 118.

The iterative coordination mechanism 624 can generate the beam-forming mechanism 138, the power-allocation mechanism 140, or a combination thereof. The iterative coordination mechanism 624 can be implemented with the beam-forming module 608, the post-processing module 610, the update module 612, a feedback loop or connection, or a combination thereof.

The initialization module 606 can use the first communication unit 416, the second communication unit 436, the third communication unit 516, the fourth communication unit 536, the first control unit 412, the second control unit 434, the third control unit 512, the fourth control unit 534, or a combination thereof to provide the initial values. The initialization module 606 can store the initial values in the first communication unit 416, the second communication unit 436, the third communication unit 516, the fourth communication unit 536, the first storage unit 414, the second storage unit 446, the third storage unit 514, the fourth storage unit 546, or a combination thereof.

After initializing, the control flow can be passed from the initialization module 606 to the iterative coordination mechanism 624 or the beam-forming module 608 therein. The control flow can pass similarly as described above between the interaction module 602 and the capacity module 604 but using processing results of the initialization module 606, such as the initial instance of the rate sum 622, the beam-forming mechanism 138, the power-allocation mechanism 140, or a combination thereof.

The computing system 100 can use the iterative coordination mechanism 624 for iteratively processing simultaneous multiple instances of the data stream 120. The computing system 100 can use the iterative coordination mechanism 624 to generate the beam-forming mechanism 138, the power-allocation mechanism 140, or a combination thereof without separating out each instance of the data stream 120.

Moreover, the computing system 100 can use the iterative coordination mechanism 624 to generate the beam-forming mechanism 138, the power-allocation mechanism 140, or a combination thereof without utilizing the SNR 152 of FIG. 1. Details regarding the iterative coordination mechanism 624 will be described below.

The beam-forming module 608 is configured to generate the beam-forming mechanism 138, the power-allocation mechanism 140, or a combination thereof for coordinating communication of the serving signal 116 and the interference signal 118. The beam-forming module 608 can further generate the beam-forming mechanism 138, the power-allocation mechanism 140, or a combination thereof coordinating between the first node device 106 and the second node device 108.

The beam-forming module 608 can generate the beam-forming mechanism 138, the power-allocation mechanism 140, or a combination thereof based on the rate coordination profile 302. The beam-forming module 608 can generate the beam-forming mechanism 138, the power-allocation mechanism 140, or a combination thereof for communicating the serving signal 116 coordinated with the interference signal 118 according to the iterative coordination mechanism 624.

The beam-forming module 608 can generate the beam-forming mechanism 138, the power-allocation mechanism 140, or a combination thereof based on the rate intersection 308 of the rate coordination profile 302 including the communication rate profile 202. The beam-forming module 608 can evaluate the rate intersection 308 for generating the beam-forming mechanism 138, the power-allocation mechanism 140, or a combination thereof. The beam-forming module 608 can evaluate the serving rate estimate 310, the interference rate estimate 312, or a combination thereof with the interference-free rate 208.

The beam-forming module 608 can include an optimal module 630, a partial module 632, or a combination thereof. The beam-forming module 608 can implement or use the optimal module 630 when the serving rate estimate 310, the interference rate estimate 312, or a combination thereof is equal to, within a threshold range around, or a combination thereof relative to the interference-free rate 208 as predetermined by the computing system 100. The beam-forming module 608 can implement or use the partial module 632 when the serving rate estimate 310, the interference rate estimate 312, or a combination thereof is not equal to, outside of the threshold range, or a combination thereof relative to the interference-free rate 208.

The optimal module 630 is configured to generate the beam-forming mechanism 138, the power-allocation mechanism 140, or a combination thereof for optimal conditions. The optimal module 630 can generate the beam-forming mechanism 138, the power-allocation mechanism 140, or a combination thereof when the interference channel measure 128, the serving channel measure 124, capability of the interference-aware receiver 114, the first user device 102, the second user device 104, or a combination thereof allow for the serving rate estimate 310, the interference rate estimate 312, or a combination thereof can achieve the interference-free rate 208.

The optimal module 630 can generate the beam-forming mechanism 138, the power-allocation mechanism 140, or a combination thereof by updating the interference-free rate 208. The optimal module 630 can update the interference-free rate 208 based on:

$$R_{I\text{-}F} = \log_2 |I_{N_r} + H_{ii} Q_i H_{ii}^\dagger|. \quad \text{Equation (14)}.$$

The term 'i' can indicate an index for referring to the first user device 102 and the second user device 104. For example, 'i=1' can represent processing iteration relative to the serving signal 116. Also for example, the 'i=2' can represent processing iteration relative to the interference signal 118

The optimal module 630 can further generate the beam-forming mechanism 138, the power-allocation mechanism 140, or a combination thereof maximizing the interference-free rate 208 as updated above. The optimal module 630 can generate the beam-forming mechanism 138, the power-allocation mechanism 140, or a combination thereof based on an argument of the maximum, such as implemented by maximum likelihood mechanism or a derivation thereof.

The optimal module 630 can implement a singular-value decomposition (SVD) mechanism 626 for generating the beam-forming mechanism 138, the power-allocation mechanism 140, or a combination thereof maximizing the interference-free rate 208. The singular-value decomposition mechanism 626 can include a method or a process for performing factorization of a set of values.

The singular-value decomposition mechanism 626 can be for performing the factorization of a real or complex matrix. The optimal module 630 can use the singular-value decomposition mechanism 626 to generate a temporary beam mechanism, a temporary power mechanism, or a combination thereof.

The temporary beam mechanism can be a potential value or instance of the beam-forming mechanism 138, the first beam mechanism 142 or the second beam mechanism 144 therein, corresponding to a specific iteration of the iterative coordination mechanism 624. The temporary beam mechanism can be a temporary instance of the beam-forming mechanism 138, represented as '$W_i^t$'.

Similarly, the temporary power mechanism can be a potential value or instance of the power-allocation mechanism 140, the first power mechanism 146 or the second power mechanism 148 therein, corresponding to a specific iteration of the iterative coordination mechanism 624. The temporary power mechanism can be a temporary instance of the power-allocation mechanism 140, represented as '$P_i^t$'.

The optimal module 630 can generate the beam-forming mechanism 138, the power-allocation mechanism 140, or a combination thereof maximizing the interference-free rate 208 based on:

$$\{W_i^t, {}'P_i^t\} = \arg\max R_{I\text{-}F}. \quad \text{Equation (15)}.$$

Moreover, the optimal module 630 can generate the beam-forming mechanism 138 based on:

$$\{W_i^t, P_i^t\} = \underset{W_t, P_t}{\arg\max}\, R_{i,diag}(Q_h) \quad \text{Equation (16)}$$

$$= \arg\max \log_2 |I_{N_t} + H_{ij} Q_j H_{ij}^\dagger + H_{ii} Q_i H_{ii}^\dagger|$$

$$= \arg\max \log_2 |A_{ij} + H_{ii} Q_i H_{ii}^\dagger|, \quad (a)$$

$$= \arg\max \log_2 \left| \begin{array}{c} L_{ii}^{-\dagger} U_{ii}^\dagger A_{ij} U_{ii} L_{ii}^{-1} + \\ V_{ii}^\dagger W_i P_i^2 W_i^\dagger V_{ii} \end{array} \right| \quad (b)$$

$$= \arg\max \log_2 |\Lambda_{ij} D_{ij} \Lambda_{ij}^\dagger + V_{ii}^\dagger W_i P_i^2 W_i^\dagger V_{ii}| \quad (c)$$

$$= \arg\max \log_2 |D_{ij} + \Lambda_{ij}^\dagger V_{ii}^\dagger W_i P_i^2 W_i^\dagger V_{ii} \Lambda_{ij}|. \quad (d)$$

In (a) of Equation (16), the first two terms in the determinant of a logarithm can be combined into a conjugate symmetric matrix represented as '$A_{ij}$'. The singular-value decomposition mechanism 626 can be applied to '$H_{ii}$' to produce decomposition components 628 including '$L_{ii} U_i$-$iV_{ii}^\dagger$'. The first matrix in (b) can be a complex normal matrix having an orthogonal eigenvector basis, which can be decomposed further into (c) with the singular-value decomposition mechanism 626. The term '$\Lambda_{ij}$' can represent a unitary matrix for deriving (d).

The optimal module 630 can further generate the beam-forming mechanism 138, the power-allocation mechanism 140, or a combination thereof based on the decomposition components 628 from the singular-value decomposition mechanism 626. The optimal module 630 can generate the beam-forming mechanism 138, the power-allocation mechanism 140, or a combination thereof based on:

$$W_i^t = V_{ii}\Lambda_{ij}.$$  Equation (17).

$$P_i^t = \text{waterfilling}(D_{ij}^{-1}).$$  Equation (18).

The term '$W_i^t$' can represent a temporary instance for the beam-forming mechanism 138 corresponding to the index for the iterative coordination mechanism 624. The term '$P_i^t$' can represent a temporary instance for the beam-forming mechanism 138 corresponding to the index for the iterative coordination mechanism 624. The terms '$V_{ii}$', '$\Lambda_{ij}$', and '$D_{ij}^{-1}$' can represent the decomposition components 628 or a derivation thereof based on the singular-value decomposition mechanism 626.

Moreover the optimal module 630 can use the water filling mechanism for equalizing the communication channels. The optimal module 630 can use the water filling mechanism fill or distribute power to the base station or the antenna. The optimal module 630 can assign more power to the data stream 120 having better channel using the water filling mechanism.

The partial module 632 is configured to generate the beam-forming mechanism 138, the power-allocation mechanism 140, or a combination thereof for non-optimal conditions. The partial module 632 can generate the beam-forming mechanism 138, the power-allocation mechanism 140, or a combination thereof when the interference channel measure 128, the serving channel measure 124, capability of the interference-aware receiver 114, the first user device 102, the second user device 104, or a combination thereof does not allow for full recognition and processing of the interference signal 118 in the receiver signal 134.

The partial module 632 can generate the beam-forming mechanism 138, the power-allocation mechanism 140, or a combination thereof when the serving rate estimate 310 is along the partial-recognition rate 210. The partial module 632 can further receive the coordination report 154 from the interaction module 602 or from another base station using the node link 112 similar to the interaction module 602 for generating the beam-forming mechanism 138, the power-allocation mechanism 140, or a combination thereof.

The partial module 632 can generate the beam-forming mechanism 138, the power-allocation mechanism 140, or a combination thereof based on the inter-node report 160 including the beam-forming mechanism 138, the power-allocation mechanism 140, or a combination thereof from the other base station, such as the second node device 108. The beam-forming mechanism 138 and the power-allocation mechanism 140 from the second node device 108 can be represented as '$W_j$' and '$P_j$', respectively with '$\Lambda_j \neq i$'. The partial module 632 can receive the inter-node report 160 using the first inter-device interface 417, the second inter-device interface 437, the third inter-device interface 517, the fourth inter-device interface 537, or a combination thereof.

The partial module 632 can generate the beam-forming mechanism 138, the power-allocation mechanism 140, or a combination thereof based on calculating a capability adjustment 634. The capability adjustment 634 is a parameter representing a degree or an effectiveness in recognition and processing of the interference signal 118 in the receiver signal 134. The capability adjustment 634 can be for characterizing the interference-aware receiver 114 or a capability thereof associated with processing of the serving signal 116, the interference signal 118, or a combination thereof. The capability adjustment 634 can be represented as '$\Gamma$'.

The partial module 632 can generate or update the partial-recognition rate 210 based on the second beam mechanism 144 received through the inter-node report 160, the capability adjustment 634, or a combination thereof. The partial module 632 can generate or update the partial-recognition rate 210 based on:

$$R_{i,diag} = \log_2\left|I_{N_r} + \frac{H_{ij}Q_jH_{ij}^\dagger}{\Gamma} + H_{ii}Q_iH_{ii}^\dagger\right|.$$  Equation (19)

The partial module 632 can generate or update the partial-recognition rate 210 based on updating the interference-free rate 208 of Equation (14) with $$\frac{H_{ij}Q_jH_{ij}^\dagger}{\Gamma},$$

representing imperfect processing for the interference signal 118. The values for '$H_{ij}Q_jH_{ij}^\dagger$' can be based on the inter-node report 160. The term '$\Gamma$' can represent the capability adjustment 634.

The partial module 632 can calculate the capability adjustment 634 based on:

$$\Gamma \approx \frac{\|\tilde{H}_{ij}\|_F^2}{\Delta \ln 2 - \|\tilde{H}_{ii}\|_F^2}.$$  Equation (20)

$$\Gamma \approx \rho_2 2^{-\frac{\Delta}{N_t}}.$$  Equation (21)

Equations (20)-(21) can represent extremes for possible values for the capability adjustment 634. The partial module 632 can include possible values predetermine by the computing system 100 for the capability adjustment 634 as a value corresponding to the SNR, the INR, or a combination thereof for the comprehensive signal measure 150 representing capabilities of the first user device 102, the second user device 104, or a combination thereof, and bounded by Equations (20)-(21).

The partial module 632 can generate the beam-forming mechanism 138, the power-allocation mechanism 140, or a combination thereof maximizing the partial-recognition rate 210. The partial module 632 can generate the beam-forming mechanism 138, the power-allocation mechanism 140, or a combination thereof maximizing the partial-recognition rate 210 similar to the optimal module 630 using the singular-value decomposition mechanism 626, argument of the maximum, or a combination thereof but for the partial-recognition rate 210 instead of the interference-free rate 208. The partial module can generate based on:

$$\{W_i^t, P_i^t\} = \arg\max R_{1,diag}.$$  Equation (22).

It has been discovered that the partial-recognition rate 210 provides increased communication efficiency and robustness. The partial-recognition rate 210 can describe and quantify the partial or imperfect recognition and processing of the interference signal 118 for the interference-aware receiver 114. The partial-recognition rate 210 can be used to coordinate across multiple base stations and further maximize the communication speeds for the serving signal 116 and the interference signal 118. Moreover, the partial-recognition rate 210 can account for various different types and capabilities for various instances of the interference-aware receiver 114 or the receiving devices.

The computing system 100 can further adjust or update the temporary instance of the beam-forming mechanism 138, the temporary instance of the power-allocation mechanism 140, or a combination thereof with the iterative coordination mechanism 624. The computing system 100 can generate the beam-forming mechanism 138, the power-allocation mechanism 140, or a combination thereof with the iterative coordination mechanism 624 for maximizing the rate sum 622. Further details regarding the iterative coordination mechanism 624 will be described below.

The beam-forming module 608 can use the first communication unit 416, the second communication unit 436, the third communication unit 516, the fourth communication unit 536, the first control unit 412, the second control unit 434, the third control unit 512, the fourth control unit 534, or a combination thereof to generate the beam-forming mechanism 138, the power-allocation mechanism 140, or a combination thereof. The beam-forming module 608 can store the beam-forming mechanism 138, the power-allocation mechanism 140, or a combination thereof in the first communication unit 416, the second communication unit 436, the third communication unit 516, the fourth communication unit 536, the first storage unit 414, the second storage unit 446, the third storage unit 514, the fourth storage unit 546, or a combination thereof.

After generating the beam-forming mechanism 138, the power-allocation mechanism 140, or a combination thereof, the control flow can be passed from the beam-forming module 608 to the post-processing module 610. The control flow can pass similarly as described above between the interaction module 602 and the capacity module 604 but using processing results of the beam-forming module 608, such as the beam-forming mechanism 138, the power-allocation mechanism 140, a portion therein, or a combination thereof.

The post-processing module 610 is configured to further adjust the power-allocation mechanism 140. The post-processing module 610 can account for a difference between an assumption that the symbols follow a Gaussian distribution and transmission using a modulation scheme, such as quadrature amplitude modulation (QAM) or a derivation thereof. The modulation scheme can restrict the water filling mechanism for the power-allocation mechanism 140.

The post-processing module 610 can adjust by implementing a post processing mechanism 638 for the power-allocation mechanism 140. The post processing mechanism 638 is a method or a process for distributing power for signals across one or more instances of the data stream 120. The post processing mechanism 638 can be for the power-allocation mechanism 140 complementing the beam-forming mechanism 138.

The post processing mechanism 638 can adjust the power-allocation mechanism 140 based on a power threshold 640, represented as '$\rho_{th}$', predetermined by the computing system 100. The post processing mechanism 638 can calculate a measure of power or the comprehensive signal measure 150 corresponding to the power-allocation mechanism 140 for comparison with the power threshold 640. For example, the post-processing module 610 can use the post processing mechanism 638 to calculate the SNR, the INR, or a combination thereof for comparison with the power threshold 640.

As a more specific example, the post-processing module 610 can use the post processing mechanism 638 to evenly adjust the power-allocation mechanism 140 when the SNR, the INR, or a combination hereof for the power-allocation mechanism 140 is larger than the power threshold 640. The post-processing module 610 can apply the post processing mechanism 638 when a single instance of the data stream 120 is selected for transmitting the serving signal 116, the interference signal 118, or a combination thereof according to the temporary instance of the power-allocation mechanism 140.

The post-processing module 610 can evenly adjust the temporary instance of the power-allocation mechanism 140 by distributing power or energy equally or evenly across available instances of the data stream 120. When the SNR, the INR, or a combination hereof for the power-allocation mechanism 140 is large enough, the available instances of the data stream 120 is likely to result in successful decoding of the signals.

It has been discovered that evenly distributing the power-allocation mechanism 140 initially including power indication greater than a threshold amount and implicating only a single instance of the data stream 120 provides increased efficiency in communication. The evenly distributed instance of the power-allocation mechanism 140 can identify and utilize the exceptional condition and the high likelihood of successful decoding for the communication signals.

The post-processing module 610 can use the first communication unit 416, the second communication unit 436, the third communication unit 516, the fourth communication unit 536, the first control unit 412, the second control unit 434, the third control unit 512, the fourth control unit 534, or a combination thereof to adjust the power-allocation mechanism 140. The post-processing module 610 can store the updated instance of the power-allocation mechanism 140 in the first communication unit 416, the second communication unit 436, the third communication unit 516, the fourth communication unit 536, the first storage unit 414, the second storage unit 446, the third storage unit 514, the fourth storage unit 546, or a combination thereof.

After adjusting the power-allocation mechanism 140, the control flow can be passed from the post-processing module 610 to the update module 612. The control flow can pass similarly as described above between the interaction module 602 and the capacity module 604 but using processing results of the post-processing module 610, such as the power-allocation mechanism 140.

The update module 612 is configured to evaluate the coordination for the communication. The update module 612 can evaluate the temporary instance of the beam-forming mechanism 138, the temporary instance of the power-allocation mechanism 140, or a combination thereof. The update module 612 can continue the iterative coordination mechanism 624, generate optimal instance of the beam-forming mechanism 138, generate optimal instance of the power-allocation mechanism 140, or a combination thereof.

The update module 612 can calculate or update the rate sum 622 based on the temporary instance of the beam-forming mechanism 138, the temporary instance of the power-allocation mechanism 140, or a combination thereof. The update module 612 can regenerate or update the rate coordination profile 302 according to the temporary instance of the beam-forming mechanism 138, the temporary instance of the power-allocation mechanism 140, or a combination thereof. The update module 612 can regenerate or update similarly as described above for the capacity module 604.

The update module 612 can calculate or update the rate sum 622 by combining, such as by adding, from the updated instances of the serving rate estimate 310 and the interference rate estimate 312 corresponding to the beam-forming mechanism 138, the power-allocation mechanism 140, or a combination thereof. The update module 612 can use the rate sum 622 as a measure for evaluating the coordination, the temporary instance of the beam-forming mechanism 138, the temporary instance of the power-allocation mechanism 140, or a combination thereof.

The update module 612 can use the rate sum 622 and the iterative coordination mechanism 624 to generate the beam-forming mechanism 138, the power-allocation mechanism 140, or a combination thereof optimizing the coordination for communicating the serving signal 116 and the interference signal 118. The update module 612 can generate the beam-forming mechanism 138 based on maximizing the rate sum 622 for representing the serving signal 116 and the interference signal 118.

For example, the update module 612 can store all temporary instances of the beam-forming mechanism 138, the power-allocation mechanism 140, or a combination thereof according to corresponding instances of the rate sum 622 over the multiple iterations for the iterative coordination mechanism 624. The update module 612 can generate the beam-forming mechanism 138, the power-allocation mechanism 140, or a combination thereof as the temporary instance thereof corresponding to the highest value of the rate sum 622.

Also for example, the update module 612 can compare the rate sum 622 of the current or instance iteration with the rate sum 622 of the previous iteration. The update module 612 can update the beam-forming mechanism 138, the power-allocation mechanism 140, or a combination thereof with the temporary instance thereof when the current iteration produces higher instance of the rate sum 622 compared to the previous iteration. The update module 612 can generate the beam-forming mechanism 138, the power-allocation mechanism 140, or a combination thereof maximizing the rate sum 622 at the end of the iterative coordination mechanism 624.

The update module 612 can increment various iteration parameters or indexes and pass the control flow to the beam-forming module 608 for the iterative coordination mechanism 624. The update module 612 can further update or regenerate the rate coordination profile 302 similar to the capacity module 604 according to the beam-forming mechanism 138, the power-allocation mechanism 140, or a combination thereof. The beam-forming module 608, the post-processing module 610, the update module 612, or a combination thereof can process for the beam-forming mechanism 138, the power-allocation mechanism 140, or a combination thereof as described above.

The update module 612 can generate the beam-forming mechanism 138, the power-allocation mechanism 140, or a combination thereof by ending the iterative process based on an iteration limit predetermined by the computing system 100. The update module 612 can further end the iterative process and generate based on an increment threshold 642.

The increment threshold 642 is a limit predetermined by the computing system 100 for evaluating an improvement across iterations for the iterative coordination mechanism 624. The increment threshold 642 can be for evaluating improvements or changes for the beam-forming mechanism 138, the power-allocation mechanism 140, or a combination thereof across iterations of the iterative coordination mechanism 624.

For example, the update module 612 can end the iterative process and generate the beam-forming mechanism 138, the power-allocation mechanism 140, or a combination thereof based on:

$$\|W_i^t - W_i^{t-1}\| < \epsilon \text{ OR } \|P_i^t - P_i^{t-1}\| < \epsilon \qquad \text{Equation (23)}.$$

The term '$\epsilon$' can represent the increment threshold 642. The update module 612 can end the iterative process when a difference in the beam-forming mechanism 138, the power-allocation mechanism 140, or a combination thereof is less than the increment threshold 642 across consecutive iterations or indices.

It has been discovered that the increment threshold 642 provides computational efficiency. The increment threshold 642 can limit the process and iterations when the interference signal 118 is weak, the SIR is high and INR is low, or a combination thereof resulting infrequent update to the beam-forming mechanism 138, the power-allocation mechanism 140, or a combination thereof.

The update module 612 can end the iterations for the iterative coordination mechanism 624. The computing system 100 can use the iterative coordination mechanism 624 to generate the beam-forming mechanism 138, the power-allocation mechanism 140, or a combination thereof maximizing the rate sum 622 characterizing both the serving signal 116 and the interference signal 118 as described above. The computing system 100 can further use the iterative coordination mechanism 624 to generate the beam-forming mechanism 138, the power-allocation mechanism 140, or a combination thereof for iteratively processing simultaneous multiple instances of the data stream 120 without the SINR 152 as described above.

The iterative coordination mechanism 624 can correspond to the interference-aware receiver 114 for the first user device 102, the second user device 104, or a combination thereof, for utilizing the comprehensive signal measure 150 without the SINR152. The iterative coordination mechanism 624 can further process and generate the beam-forming mechanism 138, the power-allocation mechanism 140, or a combination thereof addressing and coordinating for multiple instances of the data stream 120.

The computing system 100 can communicate the serving signal 116 between the first user device 102 and the first node device 106 according to the beam-forming mechanism 138, the power-allocation mechanism 140, or a combination thereof. The computing system 100 can apply the beam-forming mechanism 138, the power-allocation mechanism 140, or a combination thereof to the serving signal 116 and transmit from the first node device 106. The computing system 100 can similarly use the coordinated values for transmitting the interference signal 118 at the second node device 108.

It has been discovered that the beam-forming mechanism 138 based on the iterative coordination mechanism 624 provides increased communication efficiency. The iterative coordination mechanism 624 can coordinate the communication between base stations and implement the coordination with the beam-forming mechanism 138. Moreover, the computing system 100 can utilize the beam-forming mechanism 138 to spatially improve on the efficiency and reduce interference signals from perspective of all receiving devices.

It has been discovered that the beam-forming mechanism 138 and the power-allocation mechanism 140 resulting from coordinating for the serving signal 116 and the interference signal 118 provides decrease in error and retransmissions. The beam-forming mechanism 138 and the power-allocation mechanism 140 can coordinate signals transmitted at multiple sources to reduce interfering effects on all receivers, which can reduce processing errors and number of subsequent retransmissions.

It has been discovered that the rate sum 622 based on the rate coordination profile 302 provides efficient communication for multiple transmissions. The rate sum 622 based on the rate coordination profile 302 characterizing combined behavior of multiple transmissions can be used as a test condition or a metric directly relating to communication speed. The rate sum 622 can be used to coordinate multiple transmissions for optimizing the communication speed overall.

The update module 612 can use the first communication unit 416, the second communication unit 436, the third communication unit 516, the fourth communication unit 536, the first control unit 412, the second control unit 434, the third control unit 512, the fourth control unit 534, or a combination thereof to generate the beam-forming mechanism 138, the power-allocation mechanism 140, or a combination thereof. The update module 612 can store the beam-forming mechanism 138, the power-allocation mechanism 140, or a combination thereof in the first communication unit 416, the second communication unit 436, the third communication unit 516, the fourth communication unit 536, the first storage unit 414, the second storage unit 446, the third storage unit 514, the fourth storage unit 546, or a combination thereof.

Figure 7:
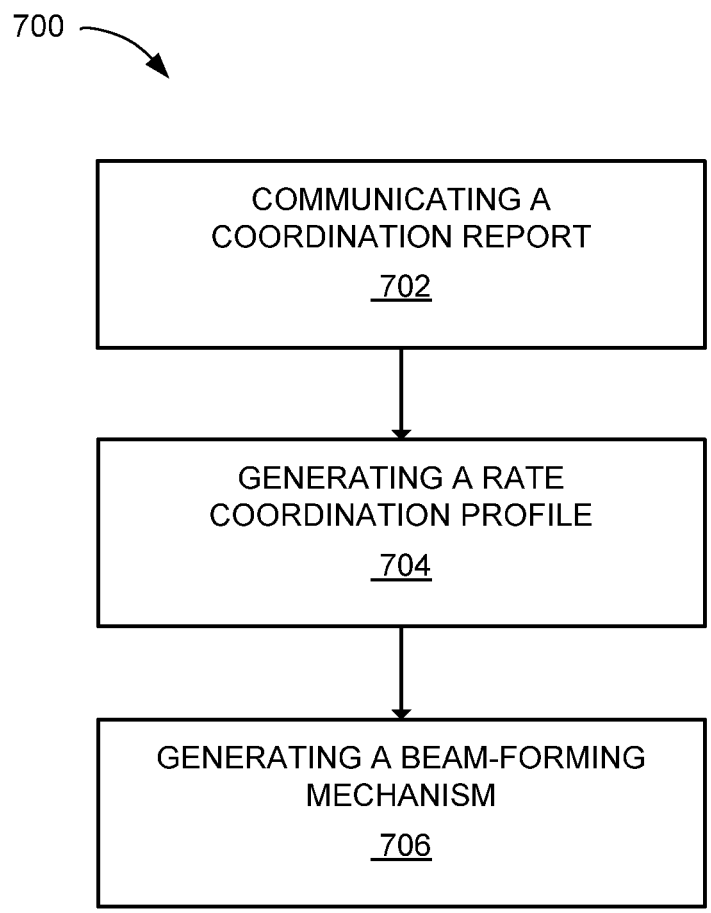
FIG. 7 is a flow chart of a method of operation of a computing system in a further embodiment of the present invention.

Referring now to FIG. 7, therein is shown a flow chart 700 of a method of operation of a computing system in a further embodiment of the present invention. The method 700 includes: communicating a coordination report for representing a receiver signal associated with an interference-aware receiver capable of recognizing an interference signal from an interference node device and included in the receiver signal in a block 702; generating a rate coordination profile based on the coordination report for coordinating the interference signal with the interference node device in a block 704; and generating a beam-forming mechanism with a communication unit based on the rate coordination profile for communicating a serving signal coordinated with the interference signal in a block 706.

The modules described in this application can be hardware implementation or hardware accelerators, including passive circuitry, active circuitry, or both, in the first communication unit 416 of FIG. 4, the second communication unit 436 of FIG. 4, the third communication unit 516 of FIG. 5, the fourth communication unit 536 of FIG. 5, the first control unit 412 of FIG. 4, the second control unit 438 of FIG. 4, the third control unit 512 of FIG. 5, the fourth control unit 538 of FIG. 5, or a combination thereof. The modules can also be hardware implementation or hardware accelerators, including passive circuitry, active circuitry, or both, within the first user device 102 of FIG. 1, the second user device 104 of FIG. 1, the first node device 106 of FIG. 1, the second node device 108 of FIG. 1, or a combination thereof but outside of the first communication unit 416, the second communication unit 436, the third communication unit 516, the fourth communication unit 536, the first control unit 412, the second control unit 434, the third control unit 512, the fourth control unit 534, or a combination thereof.

The computing system 100 of FIG. 1 has been described with module functions or order as an example. The computing system 100 can partition the modules differently or order the modules differently. For example, the iterative coordination mechanism 624 of FIG. 6 can be implemented in one module. Also for example, the capacity module 604 of FIG. 6 can be a sub-module in the interaction module 602 of FIG. 6, the partial module 632 of FIG. 6, the update module 612 of FIG. 6, the iterative coordination mechanism 624, or a combination thereof.

For illustrative purposes, the various modules have been described as being specific to the first user device 102, the second user device 104, the first node device 106, the second node device 108, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 416, the second communication unit 436, the third communication unit 516, the fourth communication unit 536, the first control unit 412, the second control unit 434, the third control unit 512, the fourth control unit 534, or a combination thereof can represent the non-transitory computer readable medium. The first communication unit 416, the second communication unit 436, the third communication unit 516, the fourth communication unit 536, the first control unit 412, the second control unit 434, the third control unit 512, the fourth control unit 534, or a combination thereof, or a portion therein can be removable from the first user device 102, the second user device 104, the first node device 106, the second node device 108, or a combination thereof. Examples of the non-transitory computer readable medium can be a non-volatile memory card or stick, an external hard disk drive, a tape cassette, or an optical disk.

The physical transformation of the receiver signal 134 of FIG. 1 from the power-allocation mechanism 140 of FIG. 1, the beam-forming mechanism 138 of FIG. 1, or a combination thereof results in the movement in the physical world, such as content displayed or recreated for the user on the first user device from processing the serving content therein. The content reproduced on the first user device 102, such as navigation information or voice signal of a caller, can influence the user's movement, such as following the navigation information or replying back to the caller. Movement in the physical world results in changes to the channel measures, the geographic location of the first user device 102, interfering transmissions, or a combination thereof, which can be fed back into the computing system 100 and influence the iterative coordination mechanism 624 of FIG. 1.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
an inter-device interface configured to communicate a coordination report for representing a receive signal associated with a serving user device including an interference-aware receiver, wherein:
the receive signal includes a serving signal for the interference-aware receiver and an interference signal for communicating information from an interference node device intended for a further user device, and
the interference-aware receiver capable of decoding each symbol of the interference signal corresponding to content payload data thereof for the interference signal,
a communication unit, coupled to the inter-device interface, configured to:
generate a rate coordination profile based on the coordination report for coordinating the interference signal with the interference node device, the rate coordination profile generated based on combining a serving rate profile and an interference rate profile, wherein:
the serving rate profile characterizes the serving user device, and
the interference rate profile characterizes the further user device intended to process the interference signal, and
generate a beam-forming mechanism based on the rate coordination profile for communicating the serving signal coordinated with the interference signal.

2. The system as claimed in claim 1 wherein the communication unit is configured to generate the beam-forming mechanism based on calculating a capability adjustment for characterizing the interference-aware receiver associated with the serving signal, the interference signal, or a combination thereof.

3. The system as claimed in claim 1 wherein the communication unit is configured to implement a post processing mechanism for a power-allocation mechanism for complementing the beam-forming mechanism.

4. The system as claimed in claim 1 wherein the communication unit is configured to:
calculate a rate sum from a serving rate estimate and an interference rate estimate based on the rate coordination profile; and
generate the beam-forming mechanism based on maximizing the rate sum for representing the serving signal and the interference signal.

5. The system as claimed in claim 1 wherein the communication unit is configured to implement a singular-value decomposition mechanism.

6. The system as claimed in claim 1 wherein:
the inter-device interface is configured to communicate the serving signal for communicating the serving signal between the serving user device including the interference-aware receiver and a serving user node device; and
the communication unit is configured to generate the beam-forming mechanism with an iterative coordination mechanism for iteratively processing simultaneous multiple data streams without a signal-to-interference-plus-noise ratio.

7. The system as claimed in claim 6 wherein the communication unit is configured to:
calculate an interference-free rate for representing the serving user device processing the serving signal and the interference signal;
updating the interference-free rate based on comparing the rate coordination profile and the interference-free rate; and
generate the beam-forming mechanism maximizing the interference-free rate.

8. The system as claimed in claim 6 wherein:
the inter-device interface is configured to receive the coordination report including an interference beam mechanism;
the communication unit is configured to:
generate a partial-recognition rate based on the interference beam mechanism, and
generate the beam-forming mechanism maximizing the partial-recognition rate.

9. The system as claimed in claim 6 wherein the communication unit is configured to evenly adjust a power-allocation mechanism when the power-allocation mechanism complementing the beam-forming mechanism is larger than a power threshold.

10. The system as claimed in claim 6 wherein the communication unit is configured to generate the beam-forming mechanism with the iterative coordination mechanism maximizing a rate sum characterizing both the serving signal and the interference signal.

11. A method of operation of a computing system comprising:
communicating a coordination report for representing a receive signal associated with a serving user device including an interference-aware receiver, wherein:
the receive signal includes a serving signal for the interference-aware receiver and an interference signal for communicating information from an interference node device intended for a further user device, and
the interference-aware receiver is capable of decoding each symbol of the interference signal corresponding to content payload data thereof for the interference signal;
generating a rate coordination profile based on the coordination report for coordinating the interference signal with the interference node device, the rate coordination profile generated based on combining a serving rate profile and an interference rate profile,
wherein:
the serving rate profile characterizes the serving user device, and
an interference rate profile for characterizing a further user device intended to, process the interference signal, and
generating a beam-forming mechanism with a communication unit based on the rate coordination profile for communicating the serving signal coordinated with the interference signal.

12. The method as claimed in claim 11 wherein generating the beam-forming mechanism includes calculating a capability adjustment for characterizing the interference-aware receiver associated with the serving signal, the interference signal, or a combination thereof.

13. The method as claimed in claim 11 wherein generating the beam-forming mechanism includes implementing a post processing mechanism for a power-allocation mechanism for complementing the beam-forming mechanism.

14. The method as claimed in claim 11 wherein generating the beam-forming mechanism includes:
  calculating a rate sum from a serving rate estimate and an interference rate estimate based on the rate coordination profile; and
  generating the beam-forming mechanism based on maximizing the rate sum for representing the serving signal and the interference signal.

15. The method as claimed in claim 11 wherein generating the beam-forming mechanism includes implementing a singular-value decomposition mechanism.

16. A non-transitory computer readable medium including instructions for a computing system comprising:
  communicating a coordination report for representing a receive signal associated with a serving user device including an interference-aware receiver, wherein:
    the receive signal includes a serving signal for the interference-aware receiver and an interference signal for communicating information from an interference node device intended for a further user device, and
    the interference-aware receiver capable of decoding each symbol of the interference signal corresponding to content payload data thereof for the interference signal;
  generating a rate coordination profile based on the coordination report for coordinating the interference signal with the interference node device, the rate coordination profile generated based on combining a serving rate profile and an interference rate profile, wherein:
    the serving rate profile characterizes the serving user device, and
    the interference rate profile characterizes the further user device intended to process the interference signal; and
  generating a beam-forming mechanism with a communication unit based on the rate coordination profile for communicating the serving signal coordinated with the interference signal.

17. The non-transitory computer readable medium as claimed in claim 16 wherein generating the beam-forming mechanism includes calculating a capability adjustment for characterizing the interference-aware receiver associated with the serving signal, the interference signal, or a combination thereof.

18. The non-transitory computer readable medium as claimed in claim 16 wherein generating the beam-forming mechanism includes implementing a post processing mechanism for a power-allocation mechanism for complementing the beam-forming mechanism.

19. The non-transitory computer readable medium as claimed in claim 16 wherein generating the beam-forming mechanism includes:
  calculating a rate sum from a serving rate estimate and an interference rate estimate based on the rate coordination profile; and
  generating the beam-forming mechanism based on maximizing the rate sum for representing the serving signal and the interference signal.

20. The non-transitory computer readable medium as claimed in claim 16 wherein generating the beam-forming mechanism includes implementing a singular-value decomposition mechanism.

* * * * *